(12) United States Patent
Rajadhyaksha et al.

(10) Patent No.: US 8,786,122 B2
(45) Date of Patent: Jul. 22, 2014

(54) HORIZONTAL-AXIS HYDROKINETIC WATER TURBINE SYSTEM WITH WATER PUMP

(71) Applicants: Vikram V. Rajadhyaksha, Dublin, OH (US); Roger Sam Huff, Johnstown, OH (US); Mookencheril P. Cherian, Dublin, OH (US)

(72) Inventors: Vikram V. Rajadhyaksha, Dublin, OH (US); Roger Sam Huff, Johnstown, OH (US); Mookencheril P. Cherian, Dublin, OH (US)

(73) Assignee: DLZ Corporation, Columbus, OH (US)

( * ) Notice: Subject to any disclaimer, the term of this patent is extended or adjusted under 35 U.S.C. 154(b) by 0 days.

(21) Appl. No.: 13/953,375

(22) Filed: Jul. 29, 2013

(65) Prior Publication Data

US 2014/0161642 A1 Jun. 12, 2014

Related U.S. Application Data

(63) Continuation-in-part of application No. 13/558,891, filed on Jul. 26, 2012, now Pat. No. 8,497,594, which is a continuation-in-part of application No. 13/191,537, filed on Jul. 27, 2011, now Pat. No. 8,525,363.

(51) Int. Cl.
| | |
|---|---|
| *F03B 13/10* | (2006.01) |
| *F03B 13/12* | (2006.01) |
| *F03B 13/00* | (2006.01) |
| *F03B 17/06* | (2006.01) |

(52) U.S. Cl.
CPC .............. *F03B 13/00* (2013.01); *F03B 17/063* (2013.01)
USPC .............................................. 290/53; 290/54

(58) Field of Classification Search
USPC .......................................... 290/42, 43, 53, 54
See application file for complete search history.

(56) References Cited

U.S. PATENT DOCUMENTS

| | | | |
|---|---|---|---|
| 1,835,018 | A | 12/1931 | Darrieus |
| 2,392,113 | A | 1/1946 | Anderson |
| 3,912,937 | A | 10/1975 | Lesser |
| 4,276,481 | A | 6/1981 | Parker |
| 4,368,392 | A | 1/1983 | Drees |
| 4,383,797 | A | 5/1983 | Lee |
| 4,415,312 | A | 11/1983 | Brenneman |
| 4,436,484 | A | 3/1984 | Temple |
| 5,066,867 | A | 11/1991 | Shim |
| 5,136,174 | A | 8/1992 | Simoni |
| 5,425,619 | A | 6/1995 | Aylor |
| 5,440,175 | A | 8/1995 | Mayo |
| 5,451,137 | A | 9/1995 | Gorlov |
| 5,947,678 | A | 9/1999 | Bergstein |
| 6,006,518 | A | 12/1999 | Geary |
| 6,109,863 | A | 8/2000 | Milliken |
| 6,239,505 | B1 | 5/2001 | Kao |
| 6,727,600 | B1 | 4/2004 | Abdurachmanov |
| 6,856,036 | B2 | 2/2005 | Belinsky |
| 7,686,571 | B1 | 3/2010 | Matheny |

(Continued)

*Primary Examiner* — Tulsidas C Patel
*Assistant Examiner* — Viet Nguyen
(74) *Attorney, Agent, or Firm* — Porter, Wright, Morris & Arthur, LLP

(57) ABSTRACT

A hydrokinetic water turbine system includes a frame structure, a horizontally-disposed rotor shaft supported by the frame structure, and a rotor secured to the rotor shaft. The rotor has a plurality of spaced-apart blades so that the flowing stream of water revolves the rotor. The flowing stream of water rotates the rotor shaft, which drives a liquid pump, which pumps a liquid to a desired location. Such as, for example, pumping water from the flowing stream to an irrigations system.

20 Claims, 24 Drawing Sheets

(56) References Cited

U.S. PATENT DOCUMENTS

| | | |
|---|---|---|
| 7,855,468 B2 | 12/2010 | Lin |
| 7,963,112 B1 | 6/2011 | Joseph |
| 8,497,594 B2 * | 7/2013 | Rajadhyaksha et al. ........ 290/53 |
| 8,525,363 B2 * | 9/2013 | Rajadhyaksha et al. ........ 290/53 |
| 2005/0064769 A1 | 3/2005 | Roos |
| 2007/0108768 A1 | 5/2007 | Dempster |
| 2008/0014089 A1 | 1/2008 | Janssen |
| 2009/0091134 A1 | 4/2009 | Lyatkher |
| 2009/0309365 A1 | 12/2009 | Sauer |
| 2009/0309366 A1 | 12/2009 | Moore |
| 2009/0315331 A1 | 12/2009 | Poupinet |
| 2010/0066089 A1 | 3/2010 | Best |
| 2010/0140947 A1 | 6/2010 | McEntee |
| 2010/0237626 A1 | 9/2010 | Hamner |
| 2011/0254275 A1 | 10/2011 | Joseph |
| 2011/0309624 A1 | 12/2011 | Ettanoor |
| 2012/0038163 A1 | 2/2012 | Hanna |
| 2012/0091717 A1 | 4/2012 | Roe et al. |

* cited by examiner

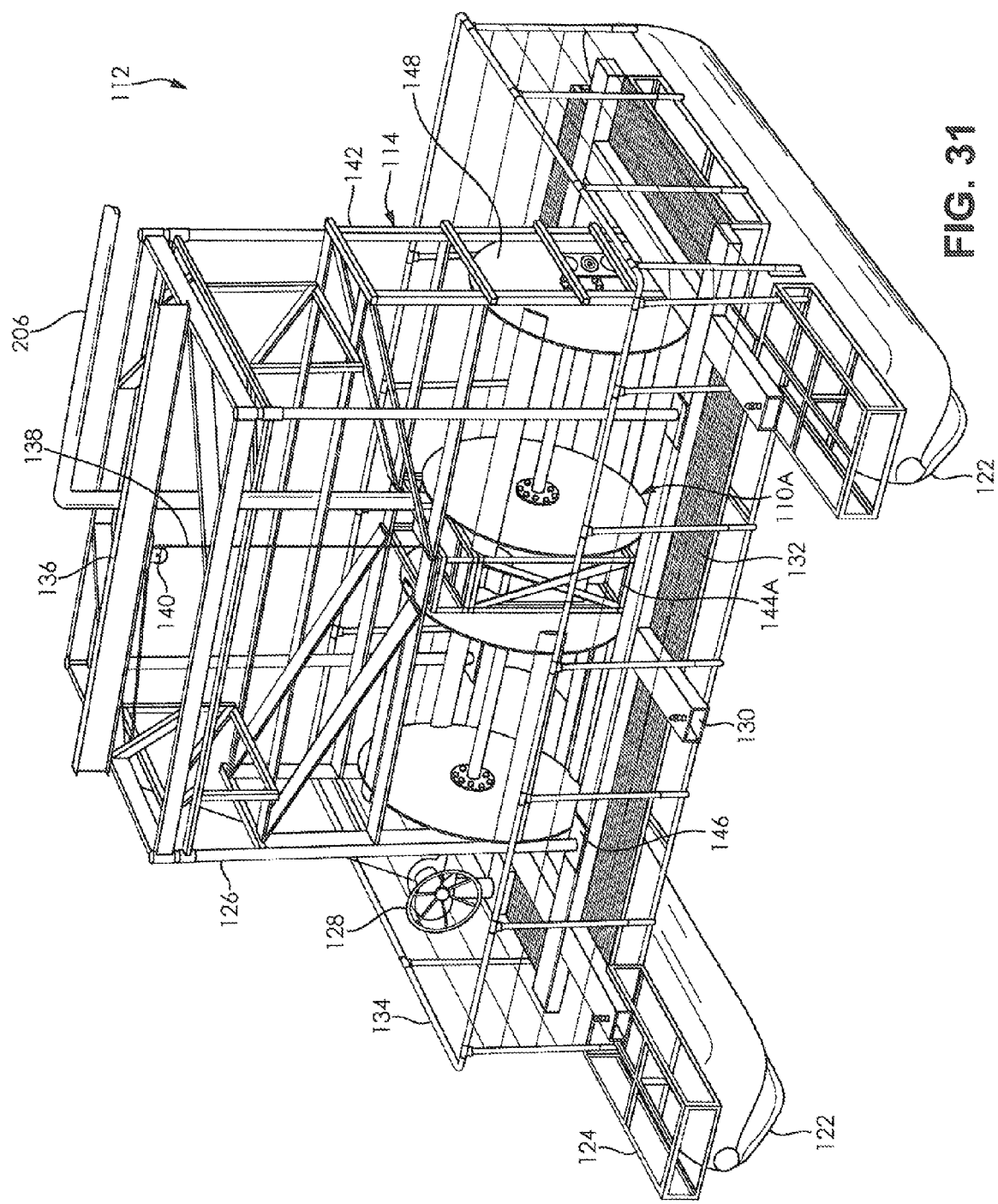

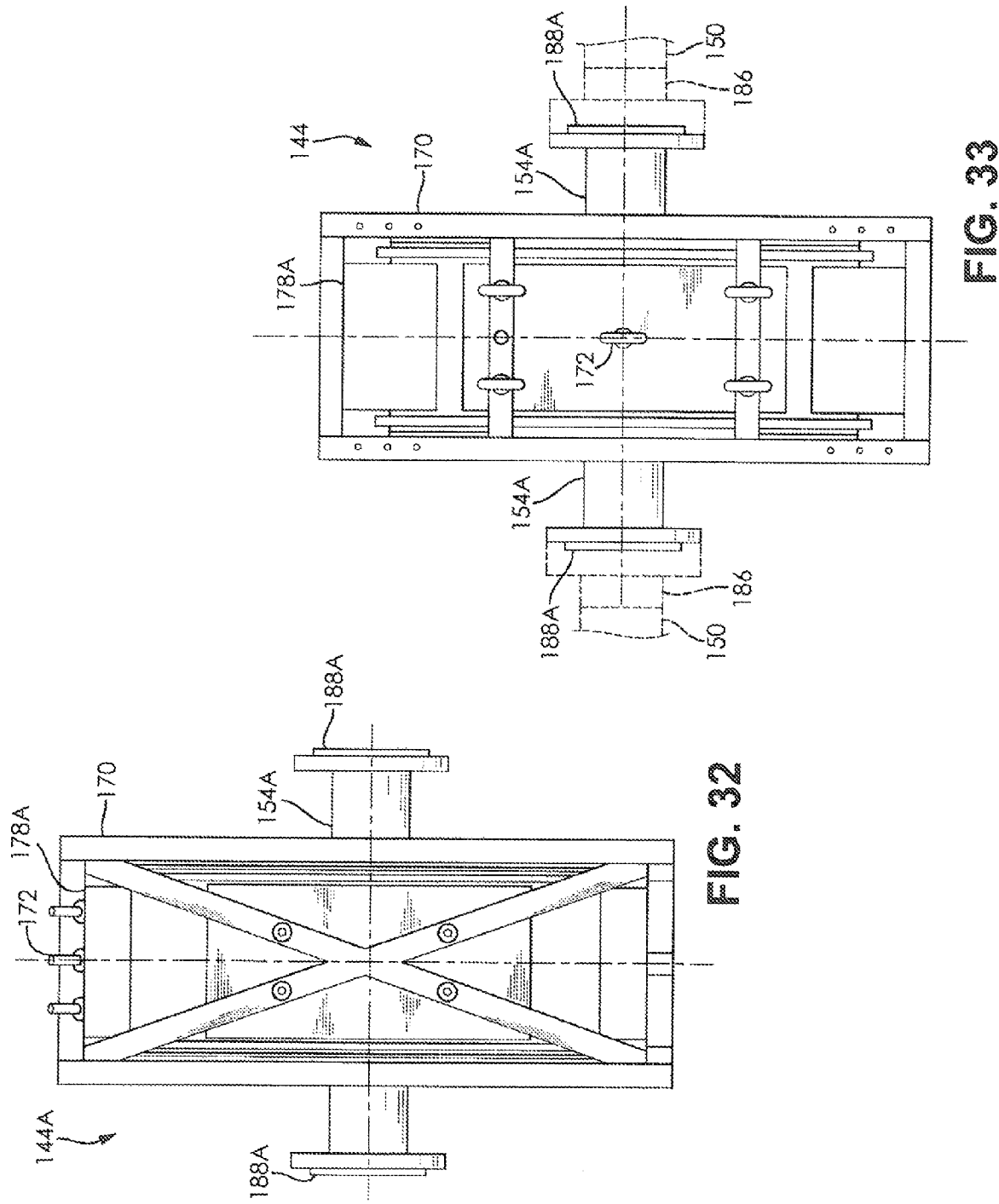

HORIZONTAL-AXIS HYDROKINETIC WATER TURBINE SYSTEM WITH WATER PUMP

CROSS-REFERENCE TO RELATED APPLICATIONS

This Application is a Continuation-in-Part (CIP) of U.S. patent application Ser. No. 13/558,891 filed on Jul. 26, 2012 now U.S. Pat. No. 8,497,594 issued on Jul. 30, 2013, which is a Continuation-in-Part (CIP) of U.S. patent application Ser. No. 13/191,537 filed on Jul. 27, 2011, the disclosures of which are expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to apparatus that convert the movement of fluid into rotational mechanical motion for the generation of mechanical power or other useful purposes and, more particularly, to hydrokinetic water turbines that harness flowing water such as in rivers, streams, canals, industrial outflows, and the like for the generation of mechanical power or other useful purposes.

BACKGROUND OF THE INVENTION

First attempts at harnessing water as a source of energy were through waterwheels used for grinding, pumping, and driving various types of equipment. Some accounts suggest waterwheels were first used as long as 4,000 years ago. These water wheels used either the elevation change across the wheel to turn it as in the case of an overshot waterwheel or used the velocity of the water to turn the wheel as in an undershot or vertically mounted waterwheel. The undershot and vertically mounted waterwheels were based on the principle of reaction forces, with the force of the water pushing buckets or paddles along causing the wheel to turn. Generally, this was a highly inefficient means of energy extraction.

In about 1931, the French inventor Georges Darrieus developed the concept of a vertical axis wind turbine using the principle of lift instead of reaction forces. However, the principle is essentially the same whether the turbine is used in wind or in water. In fact, the Darrieus-type wind turbines have been adapted to vertical-axis hydrokinetic turbines. The most significant difference is that the Darrieus-type vertical-axis hydrokinetic turbines utilize straight blades as opposed to an eggbeater design of the original Darrieus wind turbine. These Darrieus-type vertical-axis hydrokinetic turbines have a series of aerodynamically shaped blades that are mounted parallel to a vertical central shaft in a concentric arrangement. The individual hydrofoil-shaped blades are connected to the central shaft by support arms. The shaft transmits torque to a generator or other power transfer device. These hydrokinetic turbines can be supported by floating platforms anchored to the river bottom/sides or structures supported on the river bottom.

While these prior water turbines have been shown to be a potentially viable technology, commercially available water turbine systems have not been cost effective because they are expensive to manufacture and assemble and because they produce relatively small amounts of power due to their low efficiencies. Additionally, they are difficult to transport and install. Also, they are not particularly efficient in extracting energy and can create a significant impediment to a waterways flow. Accordingly, there is a need in the industry for an improved hydrokinetic water turbine system.

SUMMARY OF THE INVENTION

Disclosed are hydrokinetic water turbine systems that are an improvement over the existing hydrokinetic turbine systems described above. Disclosed is a hydrokinetic water turbine system configured to be placed in a flowing stream of water, said water turbine system comprising, in combination, a frame structure, a rotor shaft supported by the frame structure to rotate about a horizontally-disposed central axis of the rotor shaft, and a rotor secured to the rotor shaft and having a first plurality of spaced-apart blades parallel to the central axis of the rotor shaft and circumferentially spaced apart about the rotor shaft, and a second plurality of space-apart blades extending parallel to the central axis of the rotor shaft and circumferentially space-apart about the rotor shaft so that the flowing stream of water revolves the rotor about the central axis of the rotor shaft. The first and second plurality of blades are each rigidly secured to prevent relative movement between each of the blades. The first and second plurality of blades are each straight in the longitudinal direction and have a hydrofoil shape in cross-section configured to generate lift and rotate the rotor about the horizontally disposed central axis as the flowing stream of water passes around the hydrofoil shape. The second plurality of blades is spaced-apart from the first plurality of blades in the longitudinal direction and offset from the first plurality of blades so that the second plurality of blades is circumferentially located between the first plurality of blades for smooth rotation of the rotor. The system further includes a water pump having an inlet configured to intake water from the flowing stream of water, an outlet configured to outflow water from the stream of water, and a pump shaft directly driven by rotation of the rotor and configured to rotate at the same speed of rotation as the rotor.

Also disclosed is a hydrokinetic water turbine system configured to be placed in a flowing stream of water, said water turbine system comprising, in combination, a frame structure, a rotor shaft supported by the frame structure to rotate about a horizontally-disposed central axis of the rotor shaft, and a rotor secured to the rotor shaft and having a first plurality of spaced-apart blades parallel to the central axis of the rotor shaft and circumferentially spaced apart about the rotor shaft, and a second plurality of space-apart blades extending parallel to the central axis of the rotor shaft and circumferentially space-apart about the rotor shaft so that the flowing stream of water revolves the rotor about the central axis of the rotor shaft. The first and second plurality of blades are each rigidly secured to prevent relative movement between each of the blades. The first and second plurality of blades are each straight in the longitudinal direction and have a hydrofoil shape in cross-section configured to generate lift and rotate the rotor about the horizontally disposed central axis as the flowing stream of water passes around the hydrofoil shape. The second plurality of blades is spaced-apart from the first plurality of blades in the longitudinal direction and offset from the first plurality of blades so that the second plurality of blades is circumferentially located between the first plurality of blades for smooth rotation of the rotor. The first and second plurality of blades are each hollow extrusions with internal ribs between hollow cavities and the hollow cavities are filled with a material, having a weight less than a weight of a material forming the extrusions. The system further includes a liquid pump having a pump shaft driven by rotation of the rotor.

Also disclosed is a hydrokinetic water turbine system configured to be placed in a flowing stream of water, said water turbine system comprising, in combination, a frame structure, a rotor shaft supported by the frame structure to rotate about a horizontally-disposed central axis of the rotor shaft, and a rotor secured to the rotor shaft and having a first plurality of spaced-apart blades parallel to the central axis of the rotor shaft and circumferentially spaced apart about the rotor shaft, and a second plurality of space-apart blades extending parallel to the central axis of the rotor shaft and circumferentially space-apart about the rotor shaft so that the flowing stream of water revolves the rotor about the central axis of the rotor shaft. The first and second plurality of blades are each rigidly secured to prevent relative movement between each of the blades. The first and second plurality of blades are each straight in the longitudinal direction and have a hydrofoil shape in cross-section configured to generate lift and rotate the rotor about the horizontally disposed central axis as the flowing stream of water passes around the hydrofoil shape. The second plurality of blades is spaced-apart from the first plurality of blades in the longitudinal direction and offset from the first plurality of blades so that the second plurality of blades is circumferentially located between the first plurality of blades for smooth rotation of the rotor. The first and second plurality of blades are each hollow extrusions with internal ribs between hollow cavities and the hollow cavities are filled with a material having a weight less than a weight of a material forming the extrusions. The system further comprises a submerged water pump having an inlet configured to intake water from the flowing stream of water, an outlet configured to outflow water from the stream of water, and a pump shaft directly driven by rotation of the rotor and configured to rotate at the same speed of rotation as the rotor.

From the foregoing disclosure and the following more detailed description of various preferred embodiments it will be apparent to those skilled in the art that the present invention provides a significant advance in the technology and art of hydrokinetic water turbine systems. Particularly significant in this regard is the potential the invention affords for a system that is relatively easy to transport and install, relatively inexpensive to produce and assemble, and produces a relatively large amount of mechanical power and/or electrical power for its size and weight. Additional features and advantages of various embodiments of the invention will be better understood in view of the detailed description provided below.

BRIEF DESCRIPTION OF THE DRAWINGS

These and further features of the present invention will be apparent with reference to the following description and drawing, wherein:

FIG. 31 is a perspective view similar to FIG. 16 but showing a second variation of the hydrokinetic water turbine system of FIG. 15, wherein the power generation assembly is replaced with a water pump assembly.

FIG. 32 is a front elevational view of a direct-drive water pump assembly of the water turbine assembly of FIG. 31.

FIG. 33 is a top plan view of the water pump assembly of FIG. 32.

Figure 4:
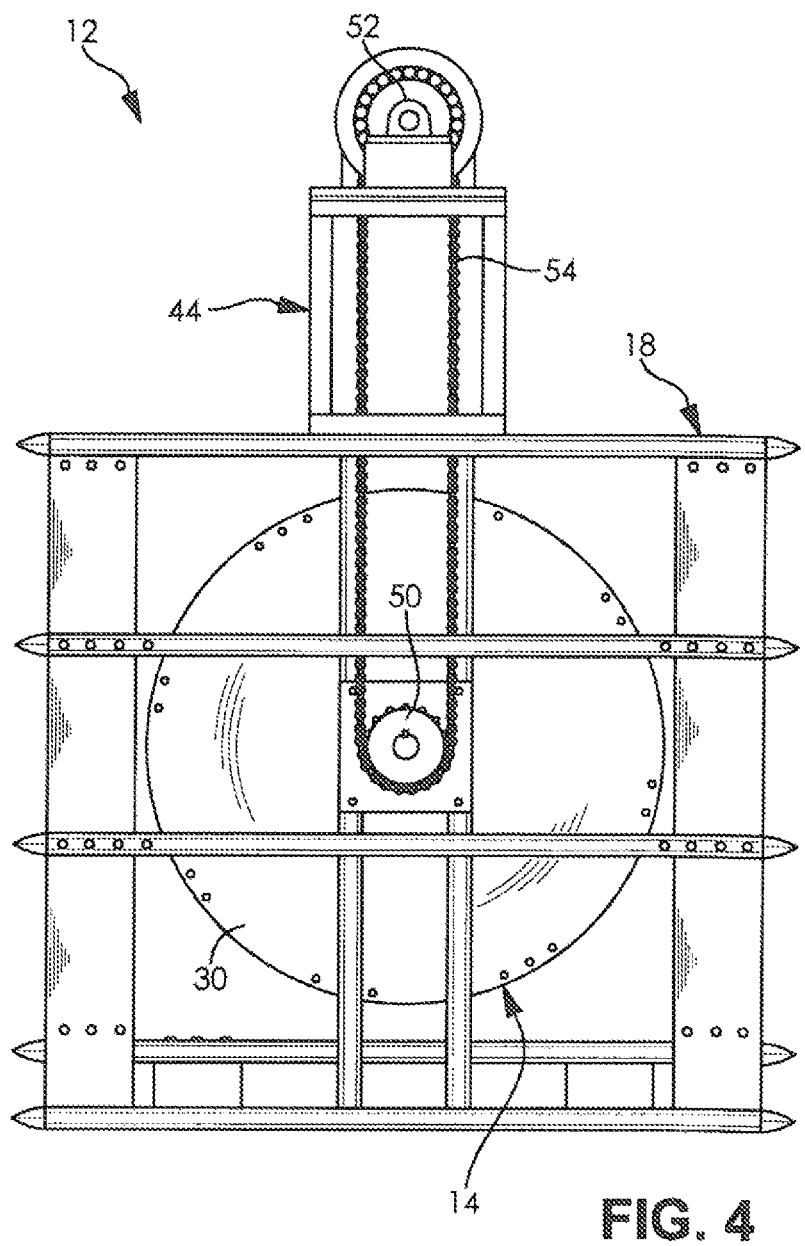
FIG. 4 is a left side elevational view of the water turbine assembly of FIGS. 2 and 3.
Figure 5:
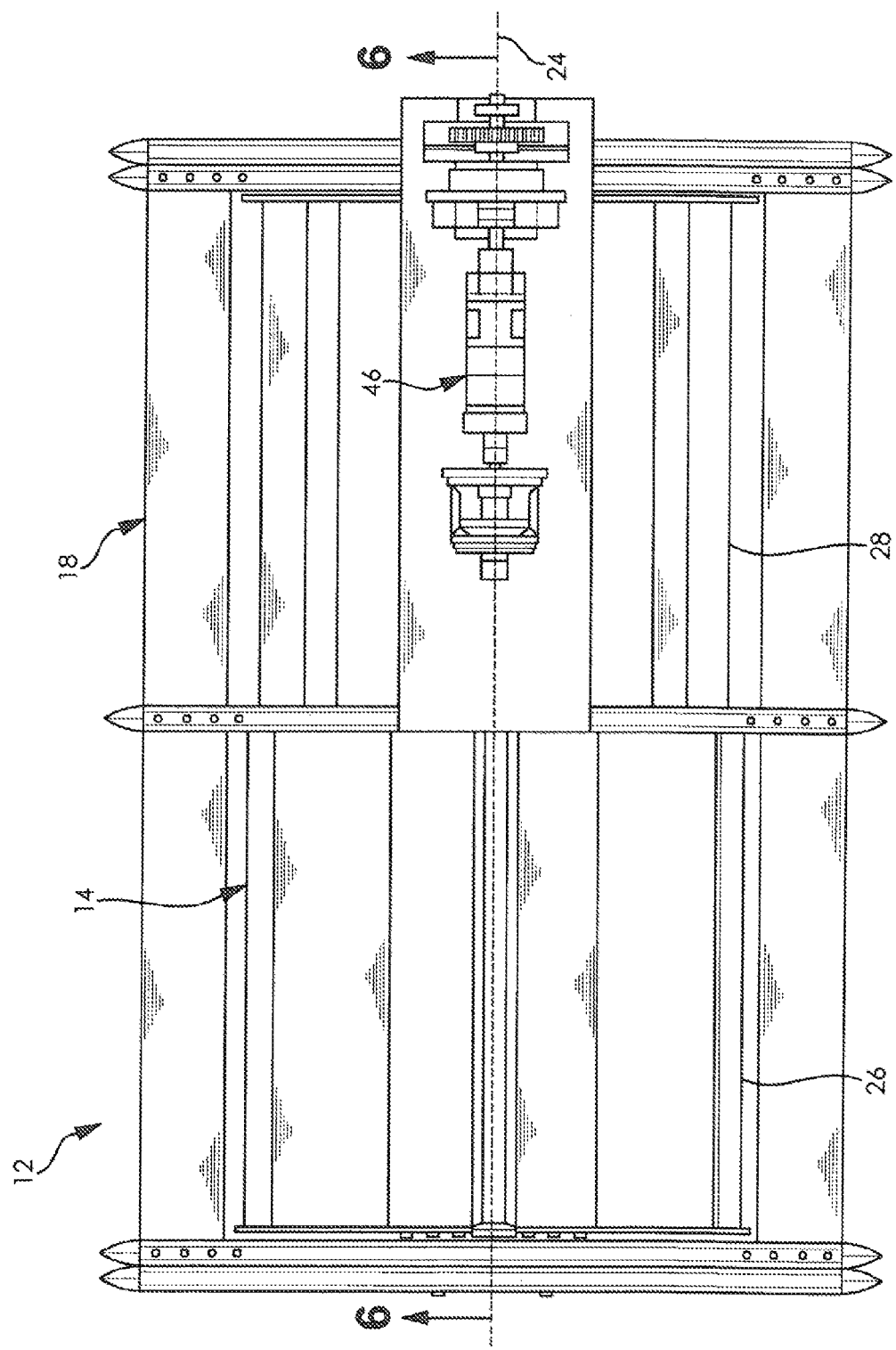
FIG. 5 is a top plan view of the water turbine assembly of FIGS. 2 to 4.
Figure 6:
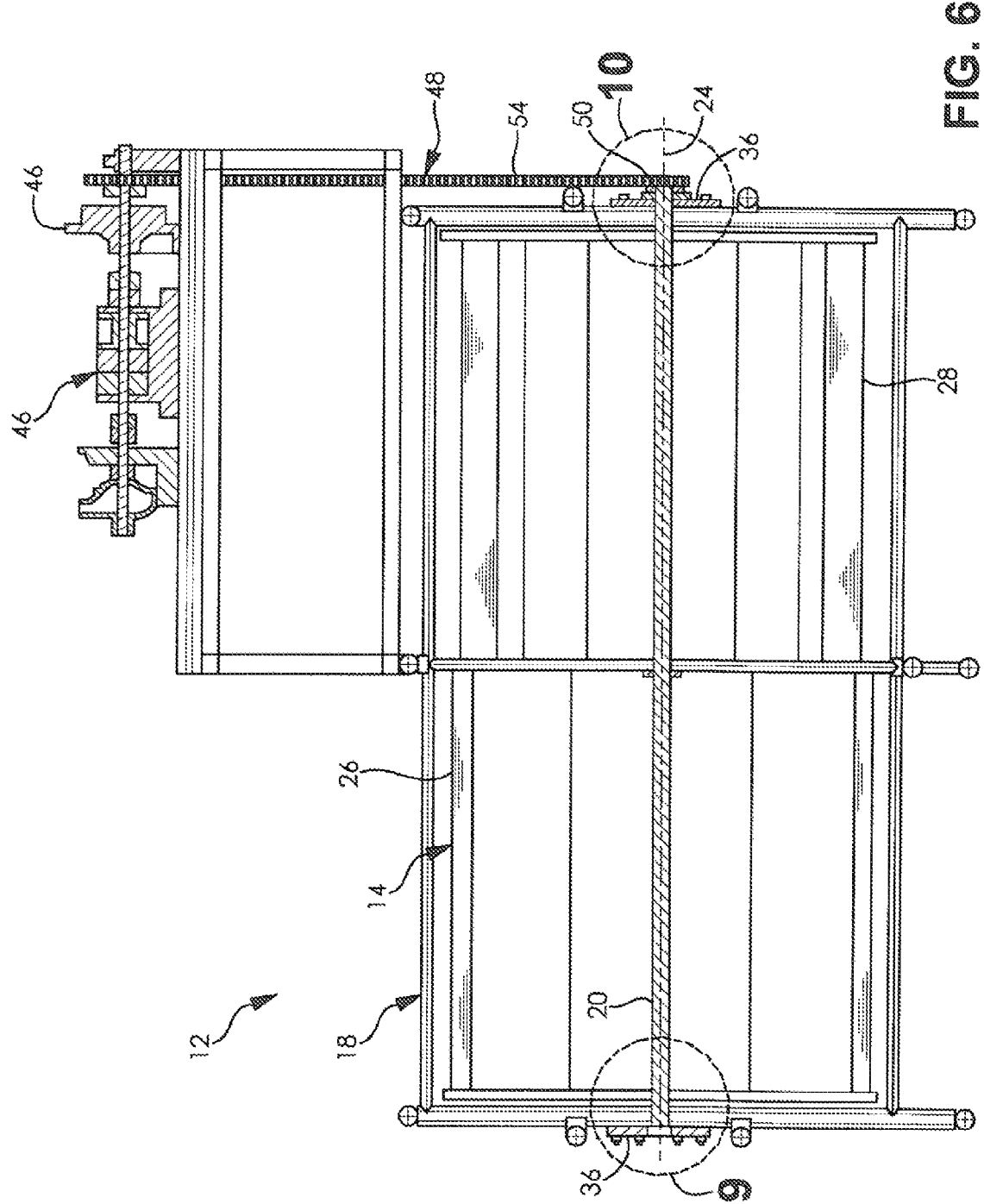
FIG. 6 is a sectional view taken along line 6-6 of FIG. 5.

It should be understood that the appended drawings are not necessarily to scale, presenting a somewhat simplified representation of various preferred features illustrative of the basic principles of the invention. The specific design features of the hydrokinetic water turbine systems as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the hydrokinetic water turbine systems illustrated in the drawings. In general, up or upward refers to an upward direction within the plane of the paper in FIGS. 4 and 8 and down or downward refers to a downward direction within the plane of the paper in FIGS. 4 and 8. Also in general, front or forward refers to a direction facing the flow of water or upstream, that is a direction toward the left within the plane of the paper in FIGS. 4 and 8 and rear or rearward refers to a direction facing away from the flow of water or downstream, that is a direction toward the right within the plane of the paper in FIGS. 4 and 8.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved hydrokinetic water turbine systems disclosed herein. The following detailed discussion of various alternative embodiments will illustrate the general principles of the invention. Other embodiments suitable for other applications will be apparent to those skilled in the art given the benefit of this disclosure.

Figure 1:
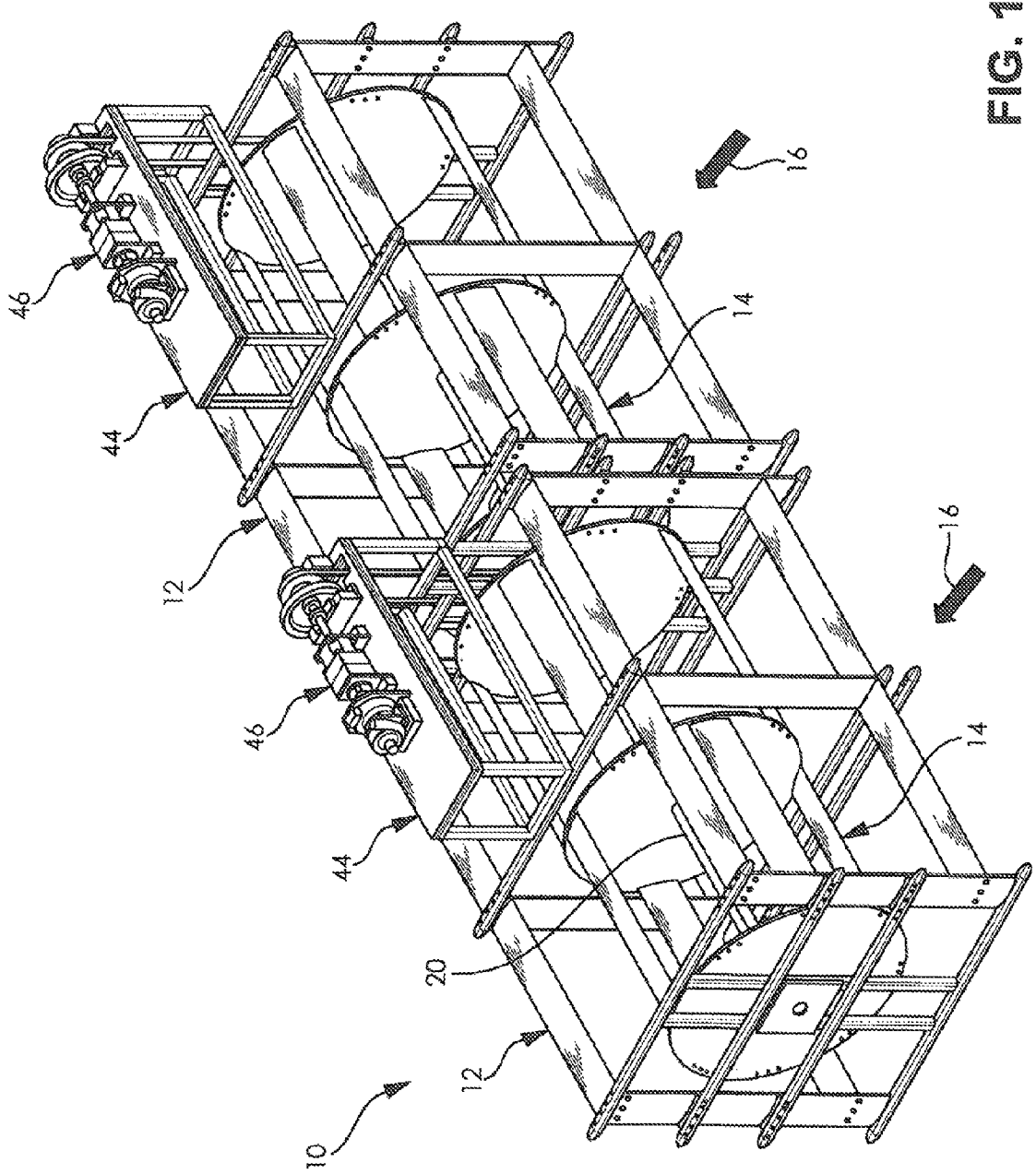
FIG. 1 is a perspective view of a horizontal-axis hydrokinetic water turbine system according to a first embodiment of the present invention.
Figure 2:
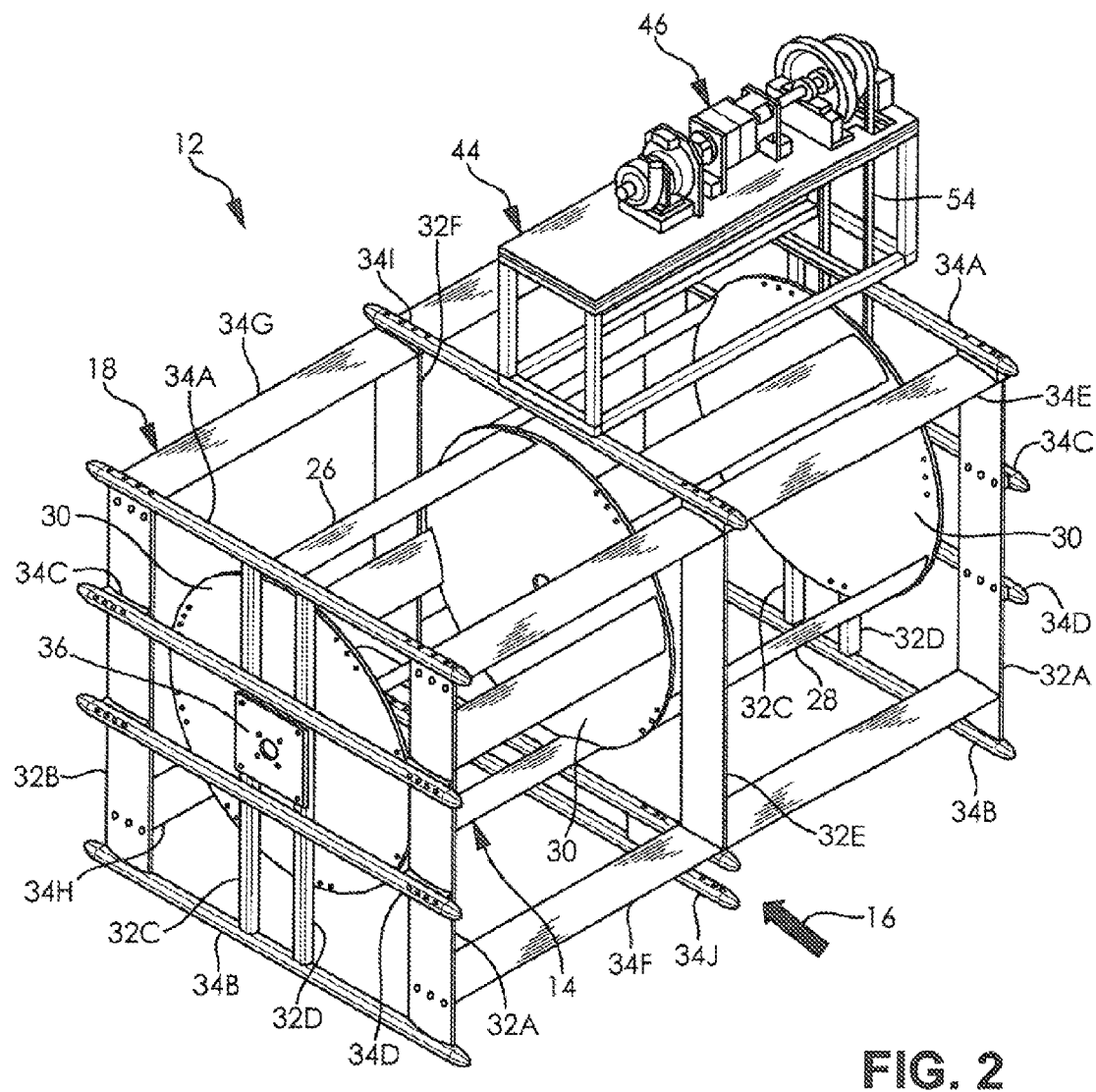
FIG. 2 is a water turbine assembly of the hydrokinetic water turbine system of FIG. 1.
Figure 3:
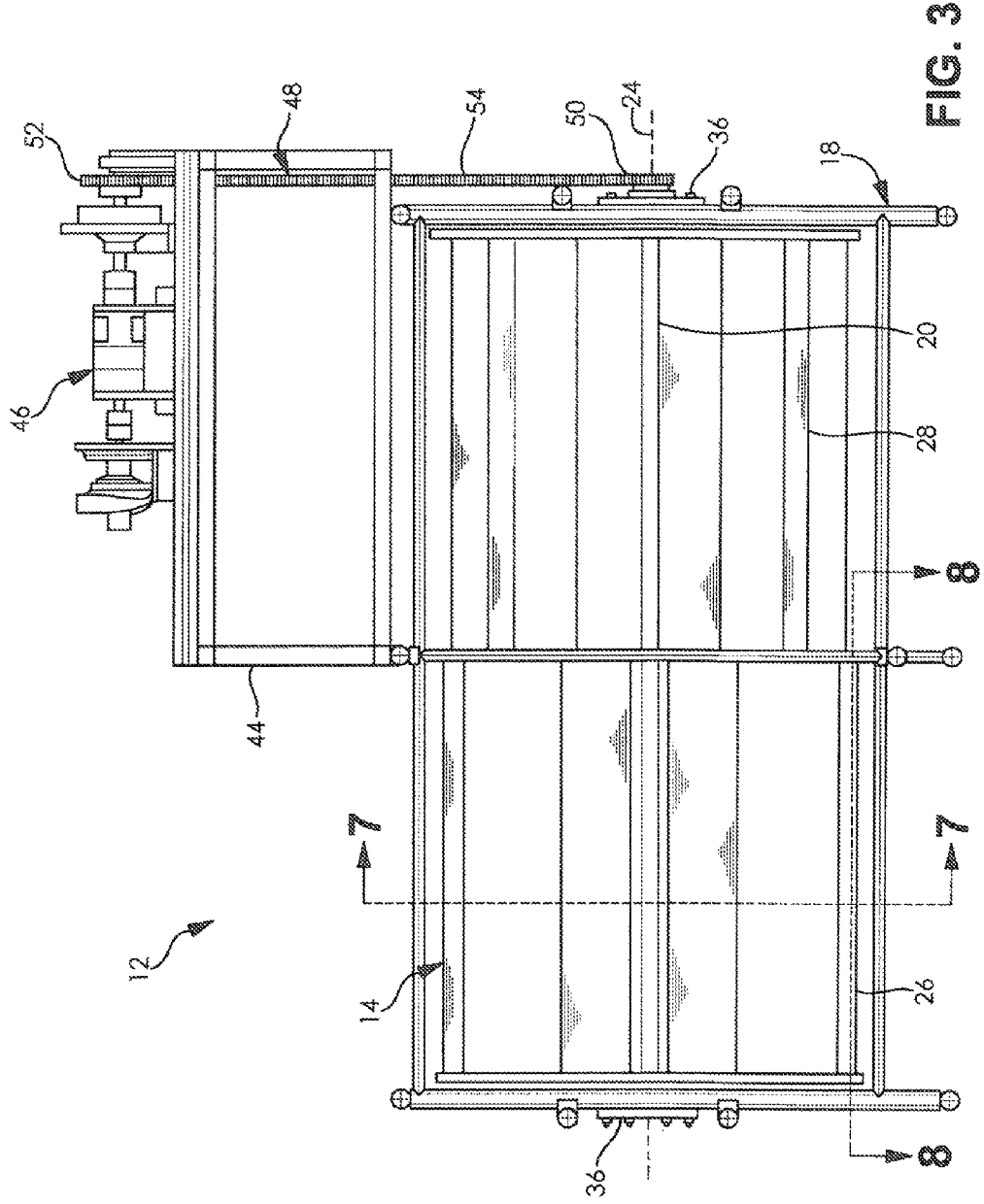
FIG. 3 is a front elevational view of the water turbine assembly of FIG. 1.

FIG. 1 illustrates a horizontal-axis hydrokinetic water turbine system 10 configured to be placed in a flowing stream of water according to a first embodiment of the present invention. The illustrated hydrokinetic water turbine system 10 includes two water turbine assemblies 12 each having a horizontal axis water wheel or rotor 14 but it is noted that the hydrokinetic water turbine system 10 can alternatively have any other quantity of water turbine assemblies 12. The illustrated first and second water turbine assemblies 12 are rigidly bound or secured together side-by-side so that the first and second rotors 14 are coaxial and extend laterally across the flow or stream of water (indicated by arrow 16), that is substantially perpendicular to the flow of water 16. The first and second water turbine assemblies 12 are substantially the same except that their rotors 14 rotate in opposite directions as described in more detail below. The counter rotating rotors 14 result in added stability of the hydrokinetic water turbine system 10 and reduces forces and torque on associated mooring/support systems.

As shown in FIGS. 2 to 10, each illustrated water turbine assembly 12 includes a frame structure 18, a rotating horizontal-axis central shaft 20 connected to the frame structure 18 through bearings 22, a rotor 14 which revolves about the central axis 24 of the shaft 20 and includes two sets of four equally-spaced blades 26, 28 connected to end or support discs 30 that are bolted to the central shaft 20. The two sets of blades 26, 28 are staggered in configuration to improve efficiency as described in more detail below.

The illustrated frame structure 18 is a substantially rectangular and open frame structure having several vertical and horizontal frame members 32, 34 secured together to form the box-like frame structure 18. The illustrated frame structure 18 is sized and shaped to support the rotor 14 entirely below the surface of the water. The frame members 32, 34 are secured together in any suitable manner such as, for example, mechanical fasteners, welding, and/or the like. The illustrated frame structure 18 has a pair of laterally spaced apart end assemblies which each include front and rear vertical frame members 32A, 32B, top and bottom horizontal frame members 34A, 34B that connect the tops and bottoms of the front and rear vertical frame members 32A, 32B, and a pair of vertically spaced-apart central horizontal frame members 34C, 34D that are secured to outer sides of the front and rear vertical members 32A, 32B between the top and bottom horizontal members 34A, 34B. The illustrated end assemblies also include a pair of shaft support vertical frame members 32C, 32D extending between the top and bottom horizontal frame members 34A, 34B and located between the front and back vertical frame members 32A, 32B to support a bearing plate assembly 36 as described in more detail below. Top and bottom front horizontal frame members 34E, 34F extend between the front vertical frame members 32A of the end assemblies and top and bottom rear horizontal frame members 34G, 34H extend between the rear vertical frame members 32B of the end assemblies. Front and rear central vertical frame members 32E, 32F extend between the top and bottom front horizontal frame members 34E, 34F and the top and bottom rear horizontal frame members 34G, 34H respectively at central locations between the end assemblies. Top and bottom central horizontal frame members 34I, 34J are secured at the top and bottoms of the front and back central vertical frame members 32E, 32F. It is noted that the frame structure 18 can alternatively have any other suitable configuration.

The illustrated individual frame members 32, 34 are each designed to reduce the coefficient of drag of the frame structure 18. The illustrated frame members 32, 34 that extend in a direction perpendicular to the flow of water 16 are shaped as hydrofoils in cross section to reduce a coefficient of drag of the frame structure 18 (best shown in FIG. 12). The illustrated frame members 32, 34 that extend in a direction parallel to the flow of water 16 have substantially bullet-shaped ends to reduce the coefficient of drag of the frame structure 18 (best shown in FIGS. 13 and 14). It is noted that all or only a portion of the frame members 32, 34 can be shaped in this manner and that any other suitable shapes can alternatively be utilized but may have less or no benefit of the reduced coefficient of drag of the frame structure.

Figure 11:
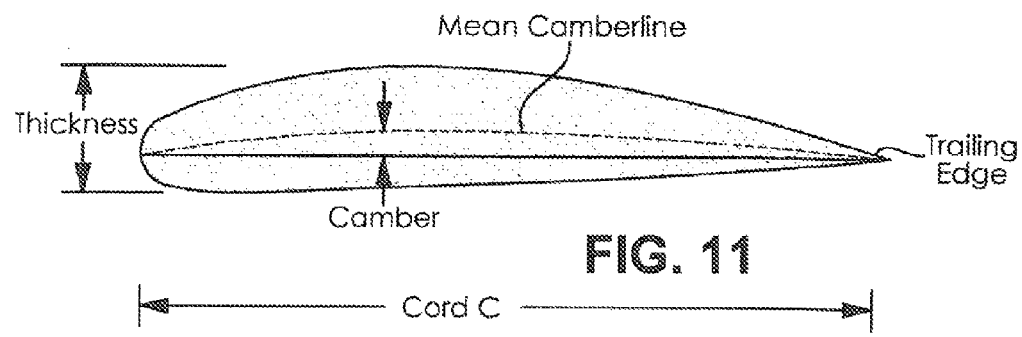
FIG. 11 is diagrammatic view of a hydrofoil illustrating geometric features.

FIG. 11 illustrates the cross section of an airfoil or hydrofoil which can be shaped to cause a desired aerodynamic effect when fluid flows there over in a direction from a leading edge to a trailing edge. A mean camber line of a hydrofoil is the locus of points halfway between the spaced-apart upper and lower surfaces as measured perpendicular to the mean camber line itself. The most forward and rearward points of the mean camber line are the leading and trailing edges, respectively. A straight line connecting the leading and trailing edges is a chord line of the hydrofoil, and a distance from the leading to the trailing edge measured along the chord line is simply designated the chord (c) of the airfoil. A thickness of the airfoil is the distance from the upper to the lower surface, measured perpendicular to the chord line, and varies with distance along the chord. The maximum thickness, and where it occurs along the chord, is an important design feature of the airfoil. Camber is the maximum distance between the mean camber line and the chord line, measured perpendicular to the chord line. Both the maximum thickness and the camber are usually expressed in terms of a percentage of the chord length; for example, a 12% thick airfoil has a maximum thickness equal to 0.12c.

Figure 12:
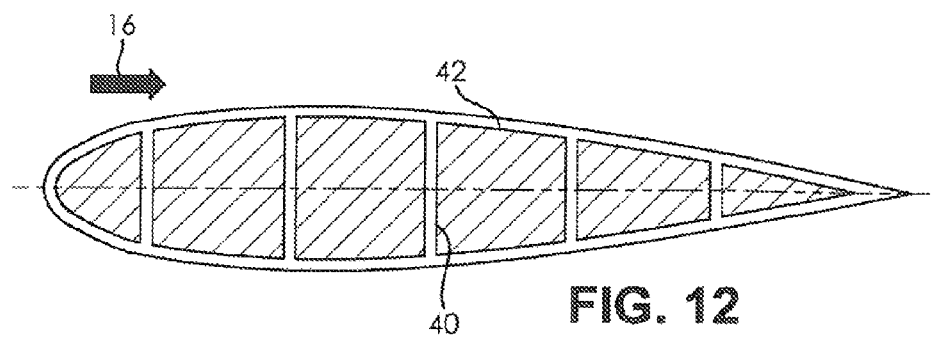
FIG. 12 is an enlarged cross-sectional view of a hollow, foam-filled hydrofoil-shaped frame member of the water turbine assembly of FIGS. 2 to 4.

The National Advisory Committee for Aeronautics (NACA) has developed standardized airfoil or hydrofoil profiles and utilizes a four digit identification system. The NACA four-digit identifications define a profile by: (1) a first digit describing maximum camber as percentage of the chord; (2) a second digit describing the distance of maximum camber from the airfoil leading edge in tens of percents of the chord; and third and fourth digits describing maximum thickness of the airfoil as percent of the chord. For example, FIG. 11 shows a NACA 2412 airfoil having a maximum camber of 2% located 40% (0.4 chords) from the leading edge with a maximum thickness of 12% of the chord. Four-digit series airfoils by default have maximum thickness at 30% of the chord (0.3 chords) from the leading edge. FIG. 12 shows a NACA 0015 airfoil which is symmetrical, the 00 in the identification indicates that the airfoil has no camber. The 15 in the identification indicates that the airfoil has a 15% thickness to chord length ratio: the airfoil is 15% as thick as it is long.

The flow of water over the hydrofoil can result in an aerodynamic force (per unit span) on the hydrofoil. The relative water stream is the magnitude and direction of the free-stream velocity far ahead of the hydrofoil. The angle between the chord line and relative water stream is defined as the angle of attack of the hydrofoil. By definition, the component of the aerodynamic force perpendicular to the relative water stream is the lift and the component of the force parallel to the relative water stream is the drag. The hydrofoil may be visualized as being supported by an axis perpendicular to the hydrofoil, and taken through any point on the hydrofoil. The hydrofoil has a tendency to twist about this axis; that is, there is an aerodynamic moment exerted on the hydrofoil. Lift is primarily a function of the shape of the hydrofoil and the angle of attack, the greater the camber and the greater the angle of attack, the greater the fit. Thus the frame members having a hydrofoil shape in cross section, can be shaped to provide a desired effect.

Figure 7A:
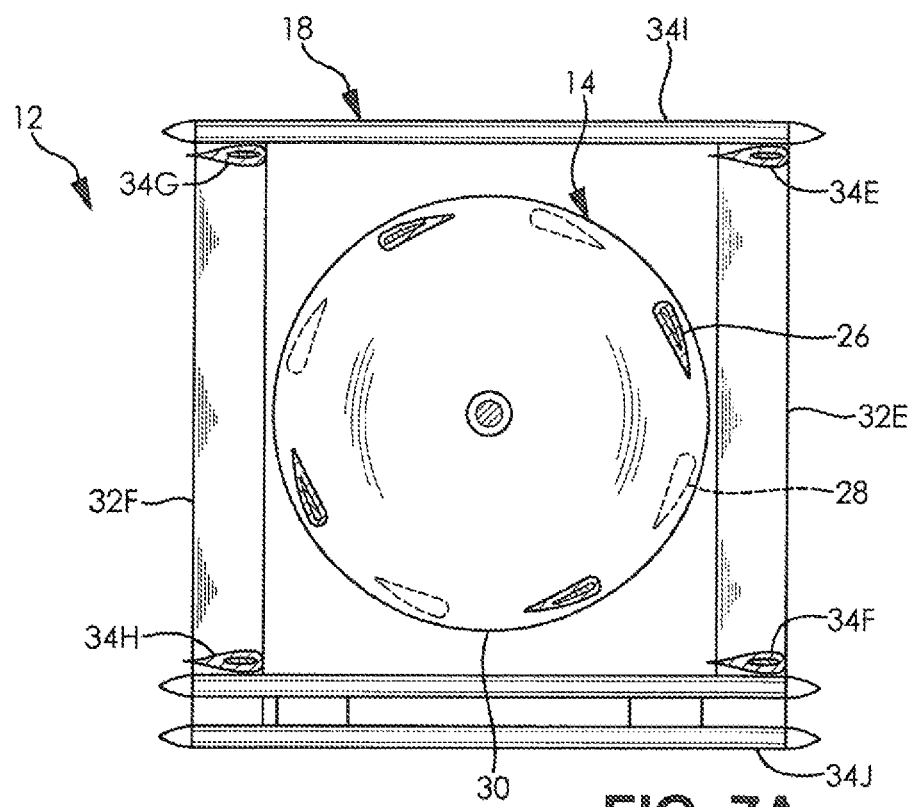
FIGS. 7A and 7B are sectional views taken along line 7-7 of FIG. 3, showing rotors of the two water turbine assemblies adapted for rotation in opposite directions.
Figure 8:
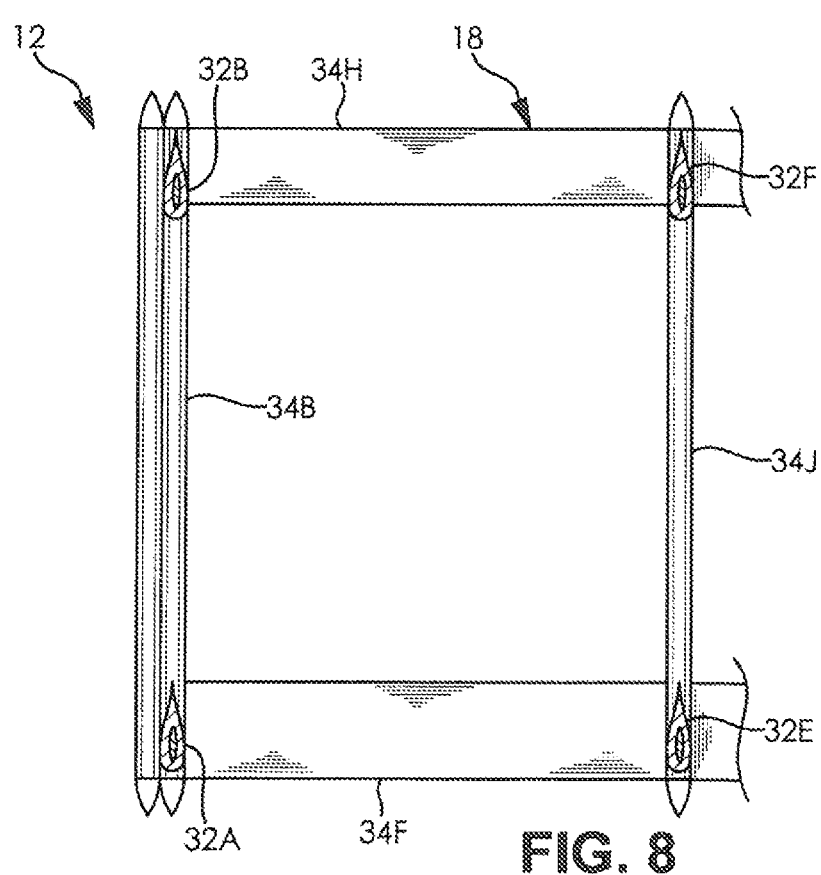
FIG. 8 is a sectional view taken along line 8-8 of FIG. 3.
Figure 7B:
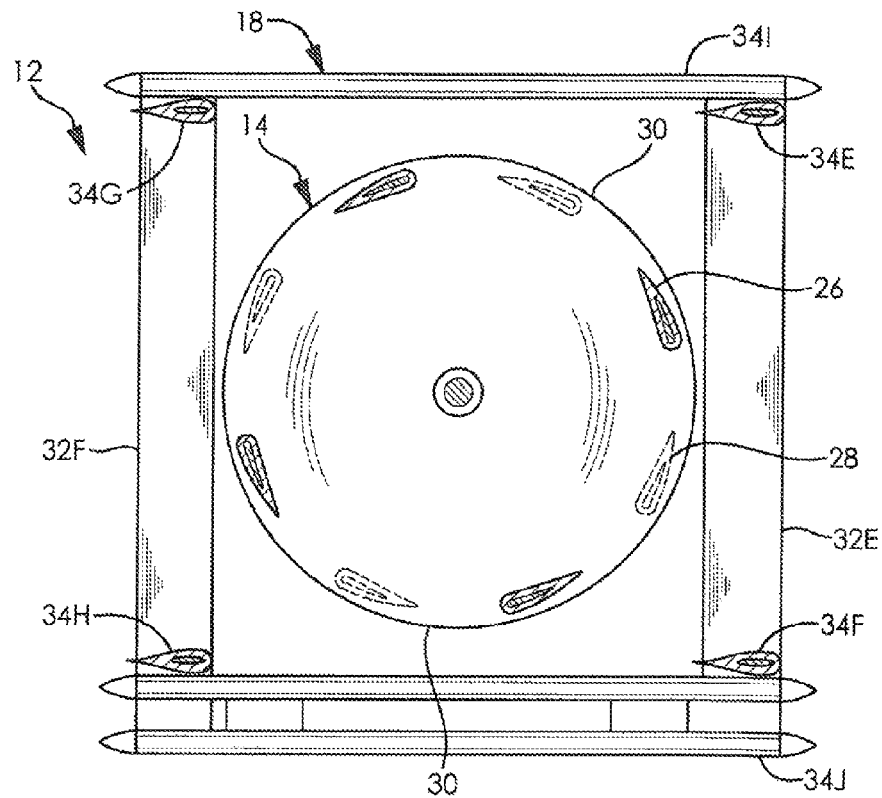
Figure 9:
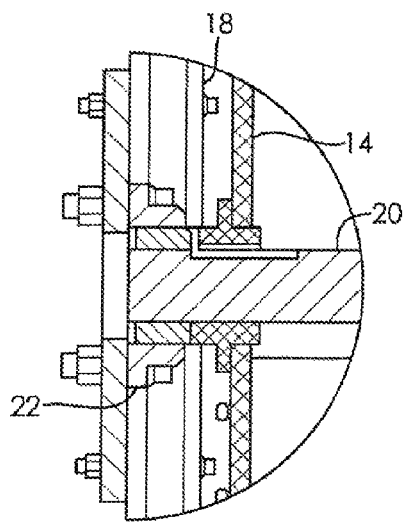
FIG. 9 is enlarged fragmented view taken from line 9 of FIG. 6.
Figure 10:
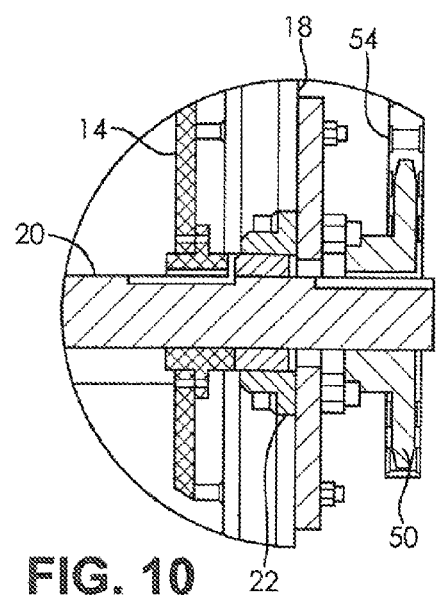
FIG. 10 is enlarged fragmented view taken from line 10 of FIG. 6.

As shown in FIGS. 7A, 7B and 8, the illustrated frame members 32, 34 that extend perpendicular to the flow of water have a hydrofoil shape of NACA 0015 to reduce a coefficient of drag of the frame structure 18. This symmetrical hydrofoil minimizes drag without substantially creating lift when positioned in the flow stream with a zero attack angle. It is noted that the hydrofoil shape of these frame members 32, 34 can alternatively be any other suitable shape depending on the aerodynamic effect desired. When these frame members 32, 34 have a profile that is the same as the blades 26, 28 as discussed in more detail below, the commonality of the profile of the blades 26, 28 and the frame members 32, 34 allows for easy mass production of a significant portion of the hydrokinetic water turbine system 10.

Figure 13:
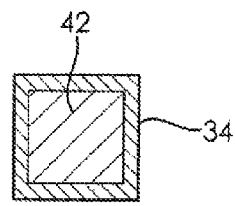
FIG. 13 is an enlarged fragmented cross-sectional view of a hollow, foam-filled frame member of the water turbine assembly of FIGS. 2 to 4.
Figure 14:
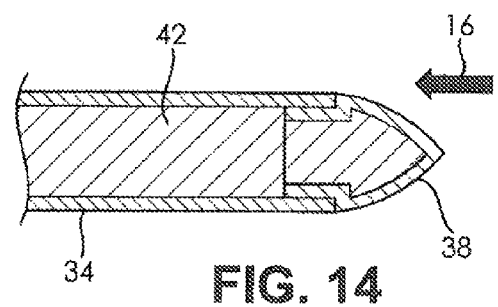
FIG. 14 is another cross-sectional view of the hollow, foam-filled circular-shaped frame member of FIG. 13.

As shown in FIGS. 13 and 14, the illustrated frame members 34 that extend parallel to the flow of water 16 can be square in cross section and have substantially bullet-shaped ends to reduce a coefficient of drag of the frame structure 18. The illustrated frame members 34 of FIGS. 2 to 4 comprise round tubes having bullet shaped end-caps 38 attached to ends thereof. The end caps 38 can be secured to the tubes in any suitable manner. The end caps 38 can be formed of any suitable material such as, for example, can be molded of a plastic. It is noted that these frame members 34 can alternatively have any other suitable shape depending on the aerodynamic effect desired and can be formed in any other desired manner such as an integral one-piece component.

Each of the illustrated frame members 32, 34 are hollow and comprise aluminum in order to reduce weight, but it is noted that the frame members 23, 34 can alternatively be solid and/or comprise any other suitable material such as, for example, carbon fiber composite, but it may result in a heavier and/or costlier structure 18. The illustrated frame members 23, 34 are hollow extrusions but it is noted that the frame members 32, 34 can alternatively be formed in any other suitable manner but it may result in a heavier and/or costlier frame structure 18. The illustrated hydrofoil-shaped hollow aluminum extrusions are provided with internal bracing or ribs 40 to increase strength. The illustrated hollow portions or cavities of the frame members 32, 34 are filled with a foam material 42 to increase buoyancy of the frame structure 18. The foam material 42 can be any suitable material such as, for example, a foamed plastic material and the like. It is noted that the foamed material can be eliminated if desired in some or all of the frame members 32, 34 in applications where a lesser amount of or no buoyancy is not desired.

The illustrated rotor shaft 20 is supported by the frame structure 18 so that the shaft 20 rotates about the horizontally-disposed central axis 24 of the shaft 20. The shaft 20 is oriented to extend laterally across the frame structure 18 between the bearing plate assemblies 36 so that the rotor shaft 20 is perpendicular to the flow of water 16. The illustrated rotor shaft 20 is supported by a pair graphite sleeve bearings 22 adapted for marine use. The illustrated sleeve bearings 22 are held by the bearing plate assemblies 36 that located at the lateral ends of the frame structure 18 to support the ends of the rotor shaft 20. The sleeve bearings 22 are preferably water lubricated. The illustrated shaft 20 is a solid aluminum round bar but any other suitable configuration and or material can alternatively be utilized.

The illustrated rotor 14 has its first, second, and third support discs 30 rigidly secured to the shaft 20 and longitudinally spaced-apart along the length of the shaft 20. The support discs 30 can be rigidly secured to the shaft 20 in any suitable manner such as, for example, mechanical fasteners, welding, and the like. The first set of four spaced-apart blades 26 extends between the first and second support discs 30 and are equally and circumferentially spaced apart about the shaft 20. The second set of spaced-apart blades 28 extends between the second and third support discs 30 and are equally and circumferentially spaced apart about the shaft 20. The illustrated rotor 14 has four blades 26, 28 located in each gap between the support discs 30 but any other suitable quantity of blades 26, 28 and/or support discs 30 can alternatively be utilized. The first set of blades 26 and the second set of blades 28 are staggered so that each set has blades between each other when viewed facing the water turbine assembly 12. The illustrated first set of blades 26 is spaced apart by 90 degrees from one another and the illustrated second set of blades 28 is spaced apart 90 degrees from one another but the second set of blades 28 are offset 45 degrees from the first set of blades 26 (best shown in FIGS. 7A and 7B). This offset between the first and second sets of blades 26, 28 allows for smooth rotation of the rotor 14 as there almost always a blade 26, 28 at the right location for rotation of the rotor 14. The illustrated blades 26, 28 are rigidly secured to the support discs 30 to prevent relative movement therebetween. The blades 26, 28 can be secured to the support discs 30 in any suitable manner such as, for example, by welding and the like. It is noted that the rotor 14 can alternatively have any other suitable configuration.

The illustrated rotor blades 26, 28 have a hydrofoil shape in cross section. As shown in FIG. 12, the illustrated blades 26, 28 have a hydrofoil shape of NACA 0015. It is noted that the hydrofoil shape of the blades 26, 28 can alternatively be any other suitable shape and/or orientation depending on the aerodynamic effect desired. It is noted that the angle of attack of the blades 26, 28 continuously changes as the blades 26, 28 rotate about the central axis 24 of the shaft 20. As best seen in FIGS. 7A and 7B, the blades 26, 28 of the first and second water turbine assemblies 12 face in opposite directions so that the rotors 14 rotate in opposite directions.

Each of the illustrated blades 26, 28 are hollow and comprise aluminum in order to reduce weight but it is noted that the blades 26, 28 can alternatively be solid and/or comprise any other suitable material such as, for example, carbon fiber composite, but it will result in heavier blades 26, 28. The illustrated blades 26, 28 are hollow extrusions but it is noted that the blades 26, 28 can alternatively be formed in any other suitable manner but it may result in a heavier and/or costlier structure. The illustrated hollow aluminum extrusions are provided with internal bracing or ribs 40 to increase strength. The illustrated hollow portions or cavities of the blades 26, 28 are filled with a foam material 42 to increase buoyancy of the blades 26, 28 to ease rotation of the rotor 14. The foam material 42 can be any suitable foam material such as, for example, a foamed plastic material and the like. When the blades 26, 28 are extruded aluminum, internally braced, and foam filled, they provide reduced weight and increased buoyancy while maximizing structural strength.

The illustrated frame structure 18 also includes a support platform 44 for an electrical power generator assembly 46 to be driven by the mechanical power generated by the rotor 14. The electrical power generation assembly 46 can be of any suitable type. It is noted that the electrical power generation assembly 46 can alternatively be replaced with any other suitable output device operable by the mechanical energy generated by the rotor 14 such as, for example, a pump or the like. The illustrated support platform 44 is located at a top of the frame structure 18 so that the electrical power generation assembly 46 mounted on the support platform 44 can be positioned above the surface of the water. The illustrated support platform 44 is also contiguous with a lateral end of the frame structure 18 so that a mechanical power transfer assembly 48 can vertically extend from an end of the shaft 20 to an end of the support platform 44. The illustrated mechanical power transfer assembly 48 comprises a chain and sprocket system having a first sprocket 50 rigidly secured to an end of the rotor shaft 20, a second sprocket 52 rigidly secured to a shaft of the electrical power generation assembly 46, and a chain 54 operably connecting the sprockets 50, 52 so that rotation of the rotor shaft 20 rotates the electrical power generation assembly 46 to produce electricity. It is noted that the mechanical power transfer assembly 48 can be of any other suitable type but may increase cost and complexity of the water turbine assembly 12.

In operation, the hydrokinetic water turbine assemblies 12 are rigidly bound or secured together side-by-side so that the first and second rotors 14 are coaxial and extend laterally across the flow of water 16, that is, substantially perpendicular to the flow of water 16. The frame structure 18 is positioned within the water so that the rotors 14 are fully submerged but the electrical power generation assemblies 46 are located above the water level. As the flow of water passes through the open frame structure 18 and the rotors 14, the rotors 14 are rotated in opposite directions by the flowing water. The mechanical power transfer assembly 48 connected to the rotor shaft 20 drives the electrical power generation assembly 46 to produce electricity from the mechanical power generated by the flowing water.

Figure 15:
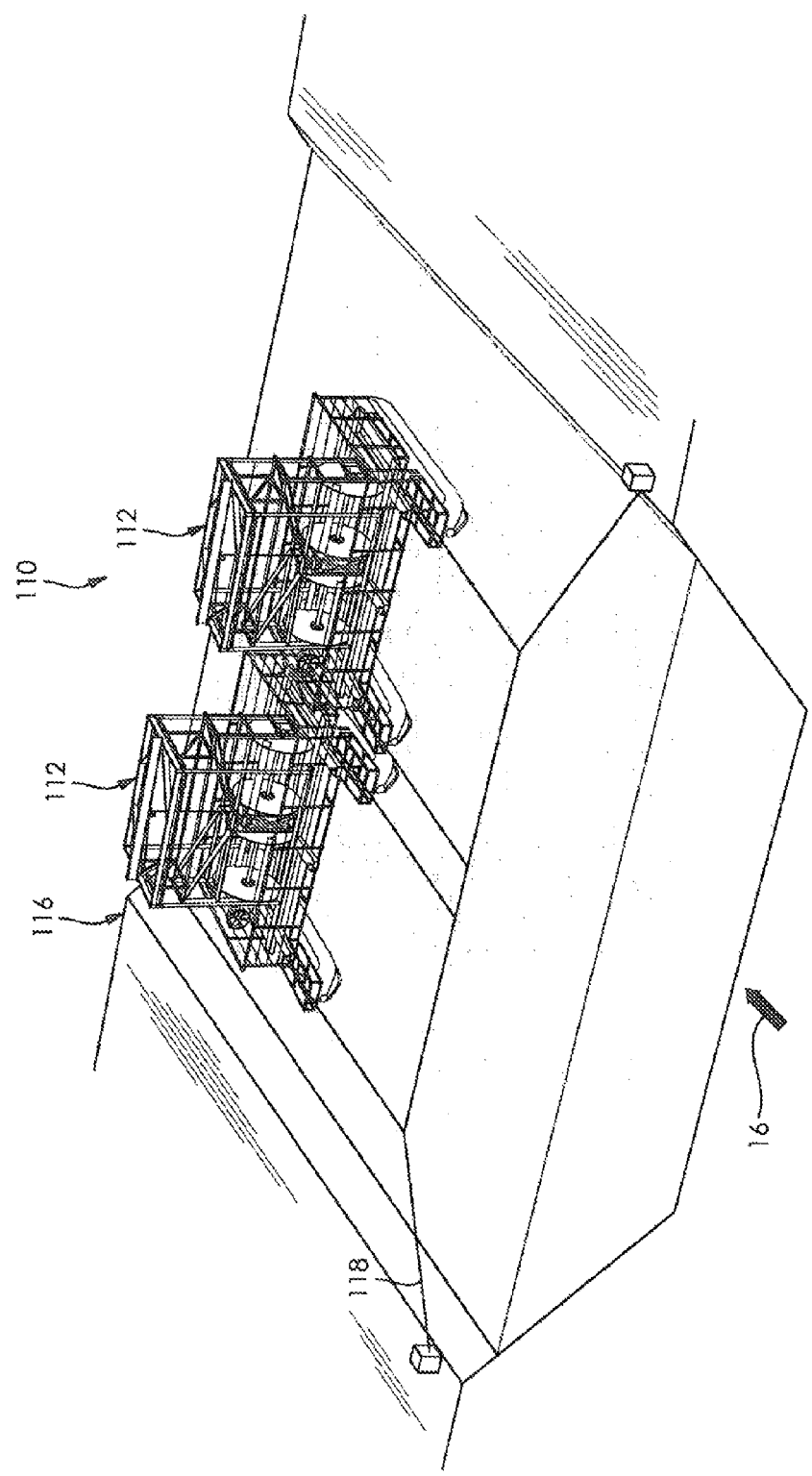
FIG. 15 is a perspective view of a horizontal-axis hydrokinetic water turbine system according to a second embodiment of the present invention.
Figure 16:
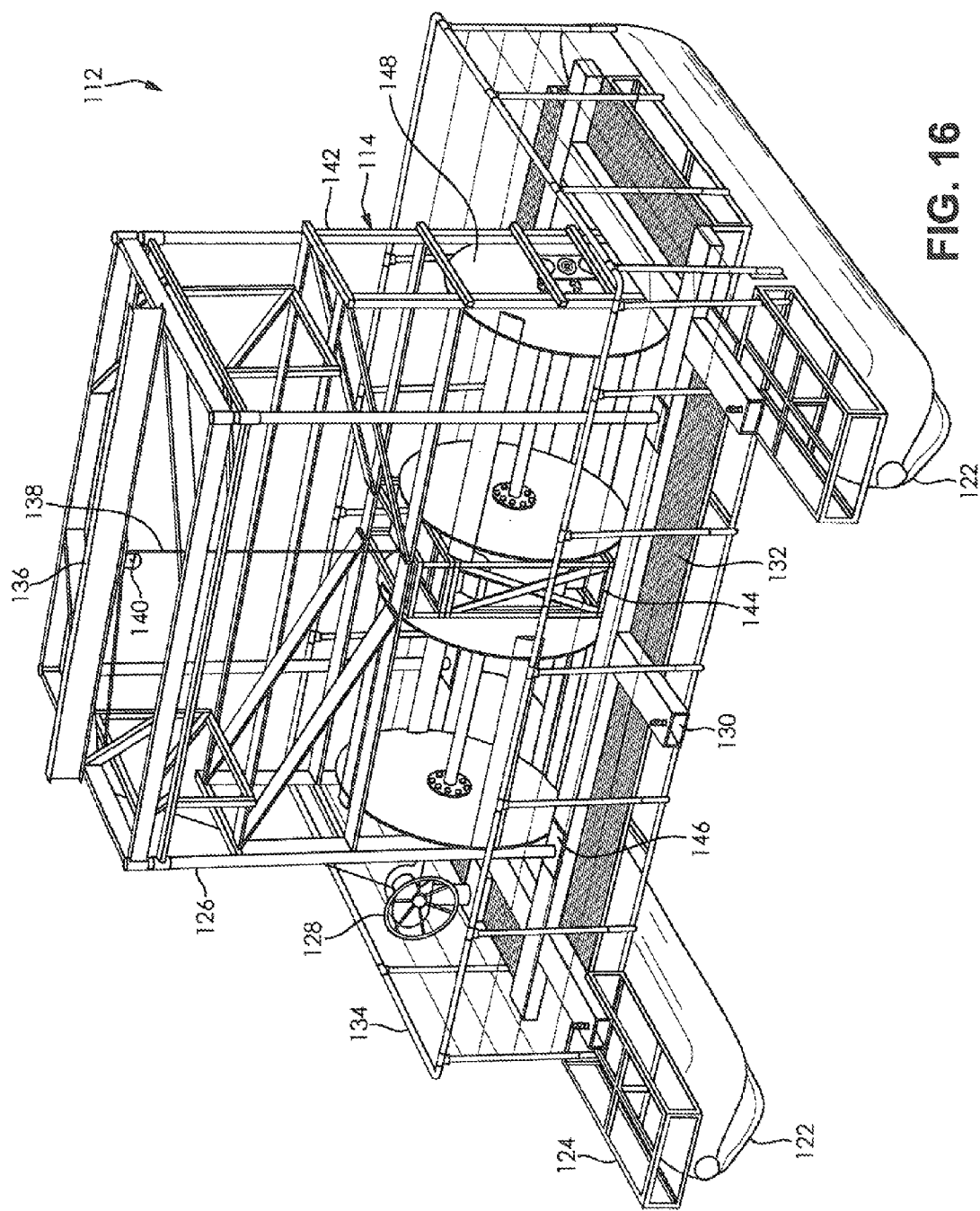
FIG. 16 is a perspective view of one of the pontoon assemblies of the hydrokinetic water turbine system of FIG. 15, wherein the associated water turbine assembly is in a raised position out of the water.
Figure 17:
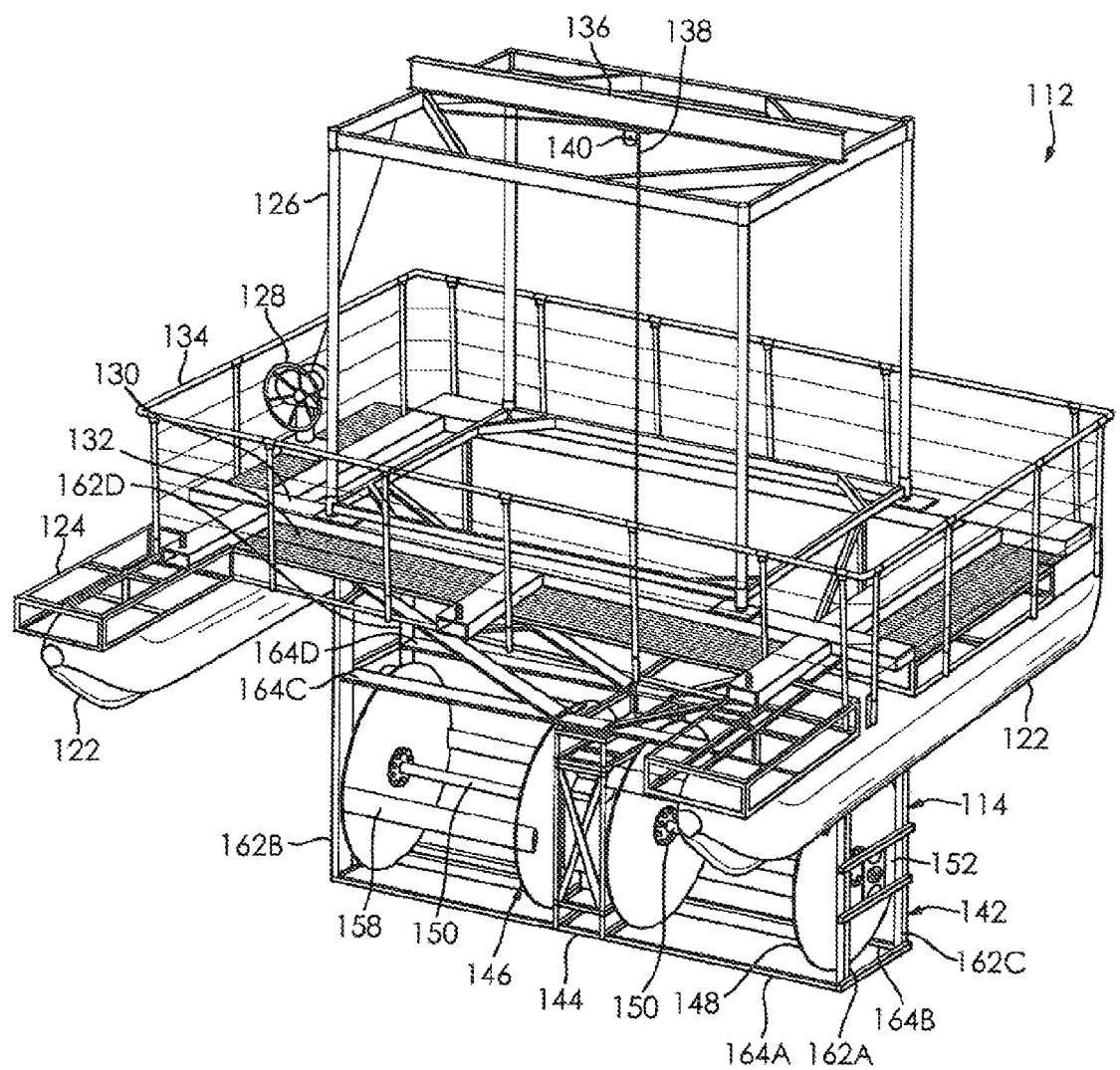
FIG. 17 is a perspective view of the pontoon assembly of FIG. 16, wherein the water turbine assembly is in a lowered position so that it is below water.
Figure 18:
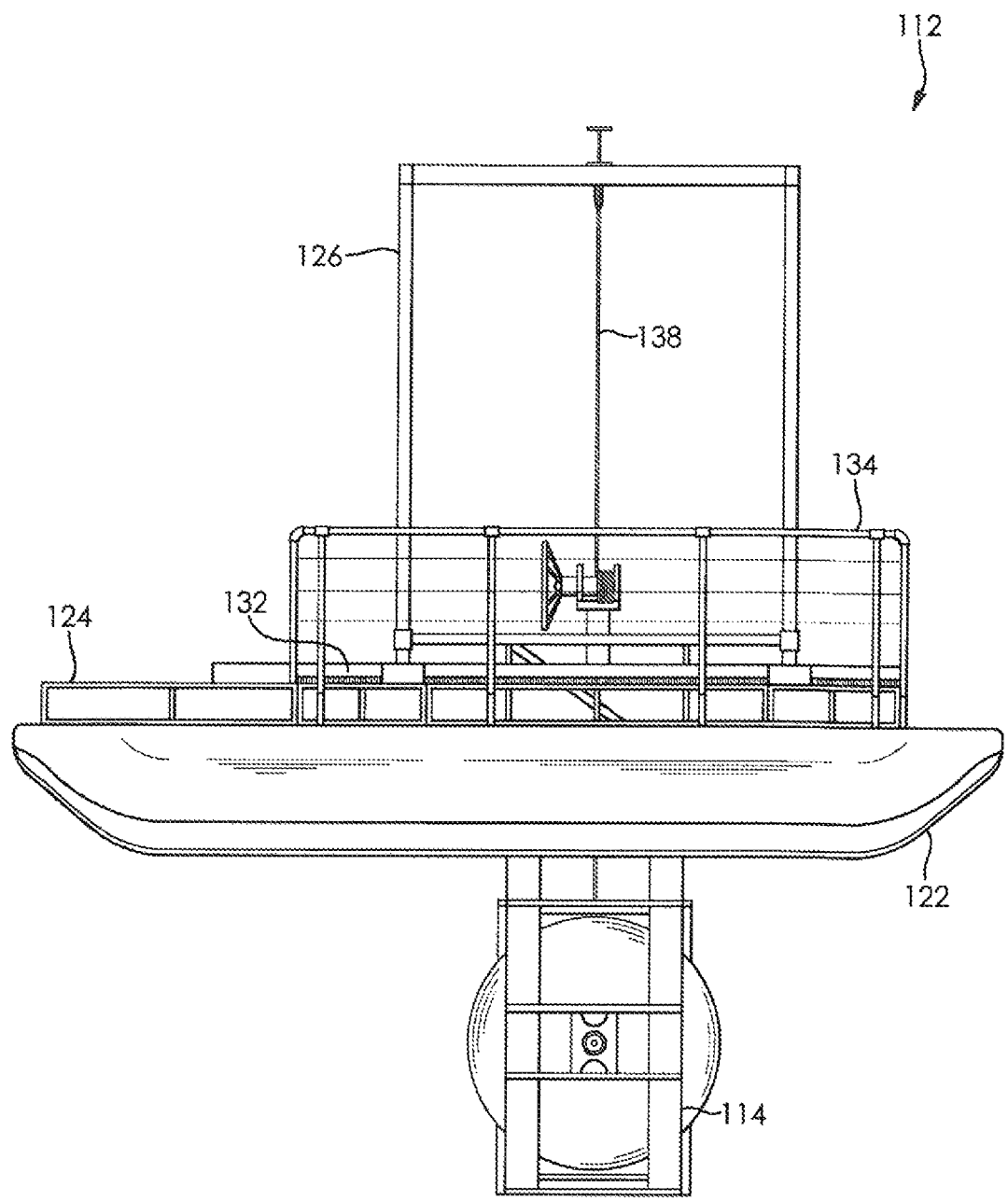
FIG. 18 is a left side elevational view of the pontoon assembly of FIG. 17.
Figure 19:
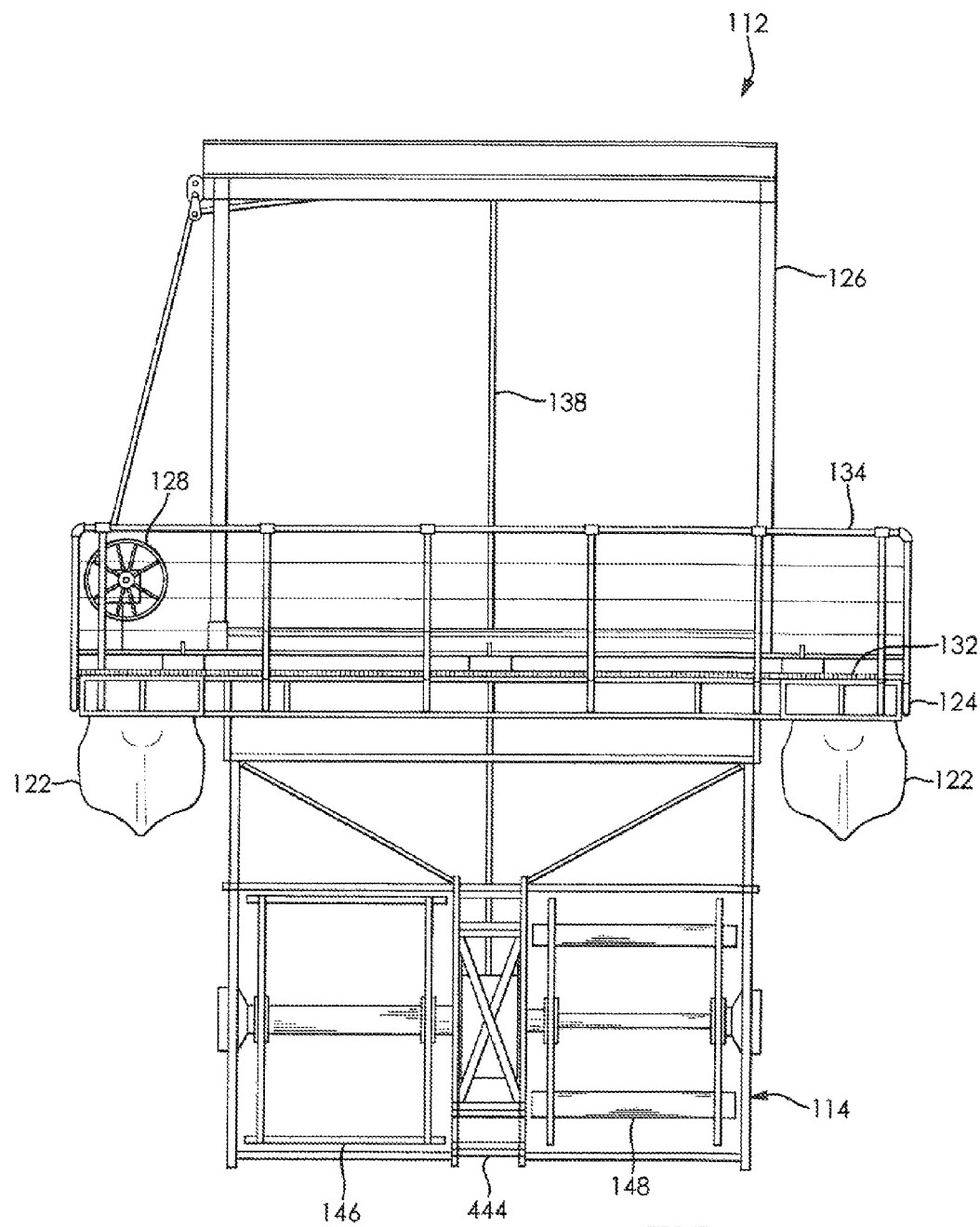
FIG. 19 is a front elevational view of the pontoon assembly of FIGS. 17 and 18.
Figure 20:
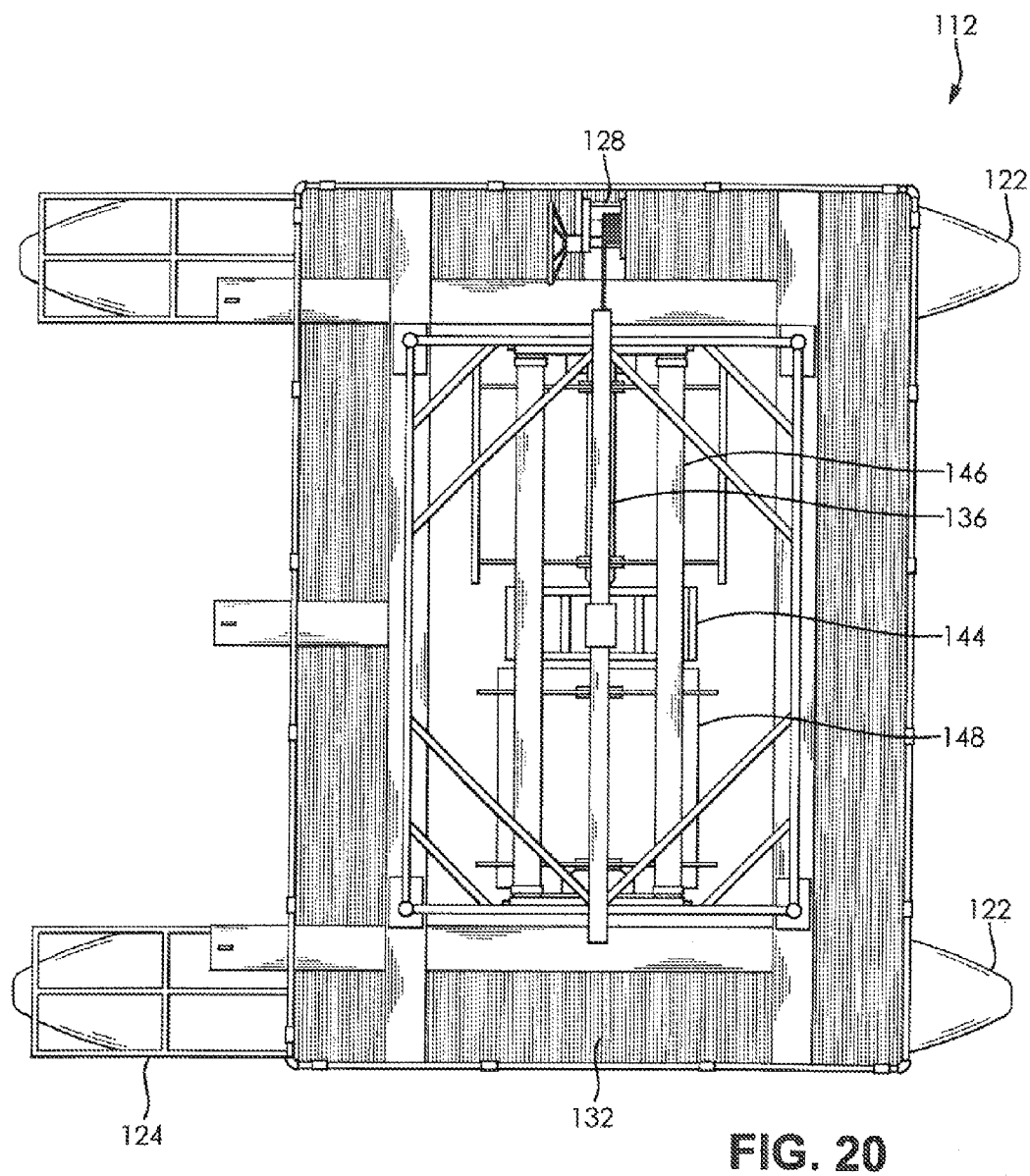
FIG. 20 is a top plan view of the pontoon assembly of FIGS. 17 to 19.

FIG. 15 illustrates a horizontal-axis hydrokinetic water turbine system 110 configured to be placed in a flowing stream of water 16 according to a second embodiment of the present invention. The illustrated hydrokinetic water turbine system 110 includes two pontoon assemblies 112, each supporting a hydrokinetic water turbine assembly 114, that are moored within a canal 116 by mooring lines 118. The illustrated pontoon assemblies 112 are bound or secured together side-by-side so that the water turbine assemblies 114 are coaxial and extend laterally across the flow or stream of water 16, that is, substantially perpendicular to the flow of water 16. It is noted that additional pontoon assemblies 112 can be added in a modular side-by-side manner if desired. The illustrated first and second water turbine assemblies 114 are substantially the same except that their rotors rotate in opposite directions as described in more detail above with regard to the first embodiment. The counter rotating rotors result in added stability of the hydrokinetic water turbine system 110 and reduces forces and torque on the associated mooring system.

FIGS. 16 to 20 illustrate the pontoon assembly 112 of the illustrated hydrokinetic water turbine system 110. It is noted that only one of the pontoon assemblies 112 is described in detail because the illustrated pontoon assemblies 112 are identical except for the rotors that rotate in opposite directions. The illustrated pontoon assemblies 112 each include a pair of laterally spaced-apart pontoons 122, a support structure 124 connecting the pontoons 122, the water turbine assembly 114, a hoist structure 126 for supporting a hoist 128 for raising the water turbine assembly 114 out of the water (best shown in FIG. 16) and lowering the water turbine assembly 114 into the water (best shown in FIG. 17). The pontoons 122 can be of any suitable type for floating on the surface of the water and supporting the remaining components of the pontoon assembly 112. The illustrated support structure 124 includes supports 130 that connect the pontoons 122 together at a distance such that the water turbine assembly 114 can be raised and lowered between the pontoons 122. Decking or planking 132 is provided on the supports 130 encircling an opening for raising and lowering the water turbine assembly 114 and hand rails 134 are provided about the decking 132. The illustrated hoist structure 126 extends upward from the supports 130 about the opening and supports a hoist beam 136 above the opening. The illustrated hoist 128 includes a hoist rope 138 extending to the water turbine assembly 114 via a pulley 140 located on the hoist beam 136 to raise and lower the water turbine assembly 114 between a raise position wherein it is out of the water (best shown in FIG. 16) and a lowered position wherein it is under the water (best shown in FIG. 17). The hoist 128 can be of any suitable type and can be alternatively configured in any other suitable manner.

Figure 21:
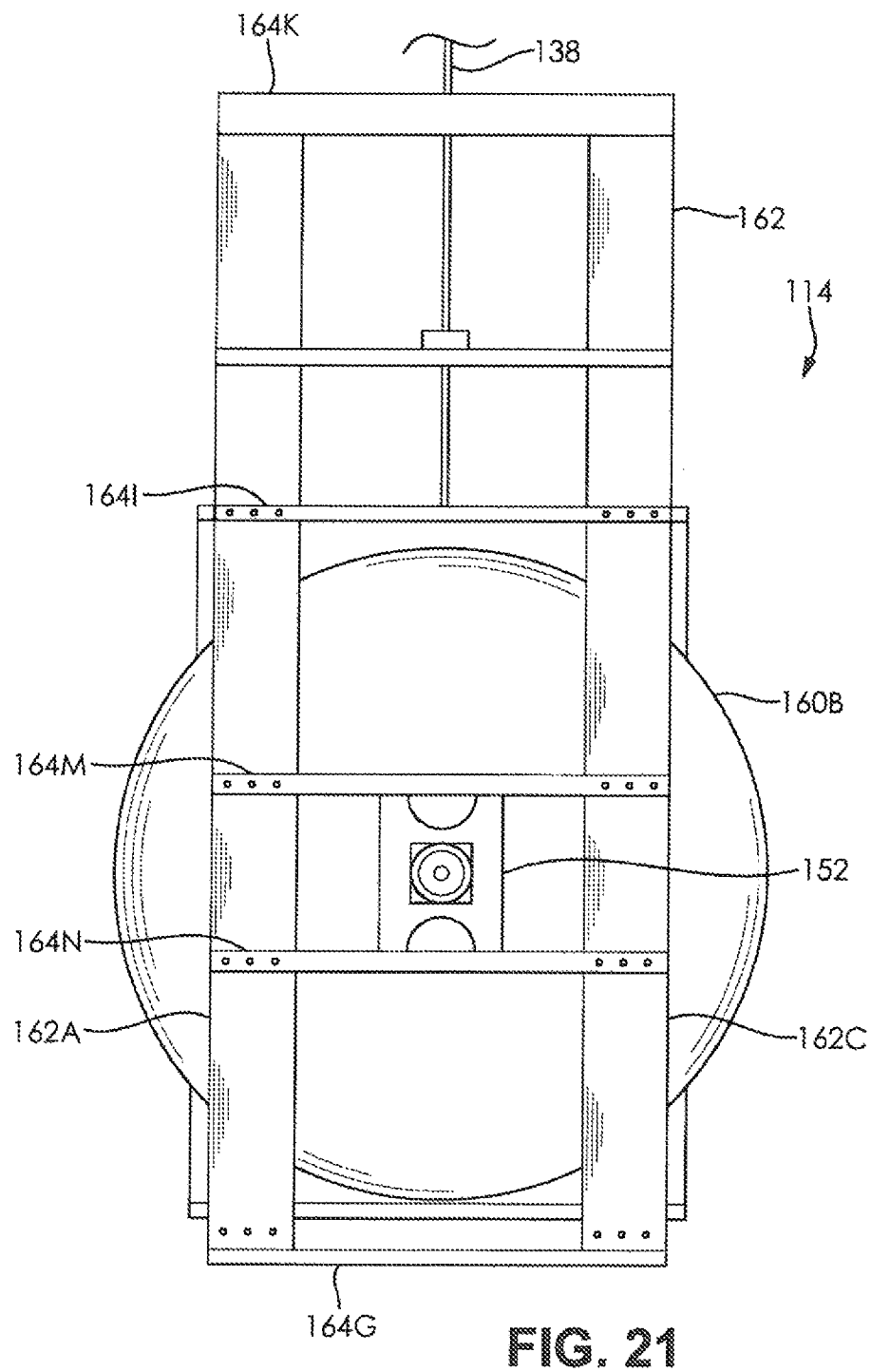
FIG. 21 is a left side elevational view of the water turbine assembly of the pontoon assembly of FIGS. 17 to 19.
Figure 22:
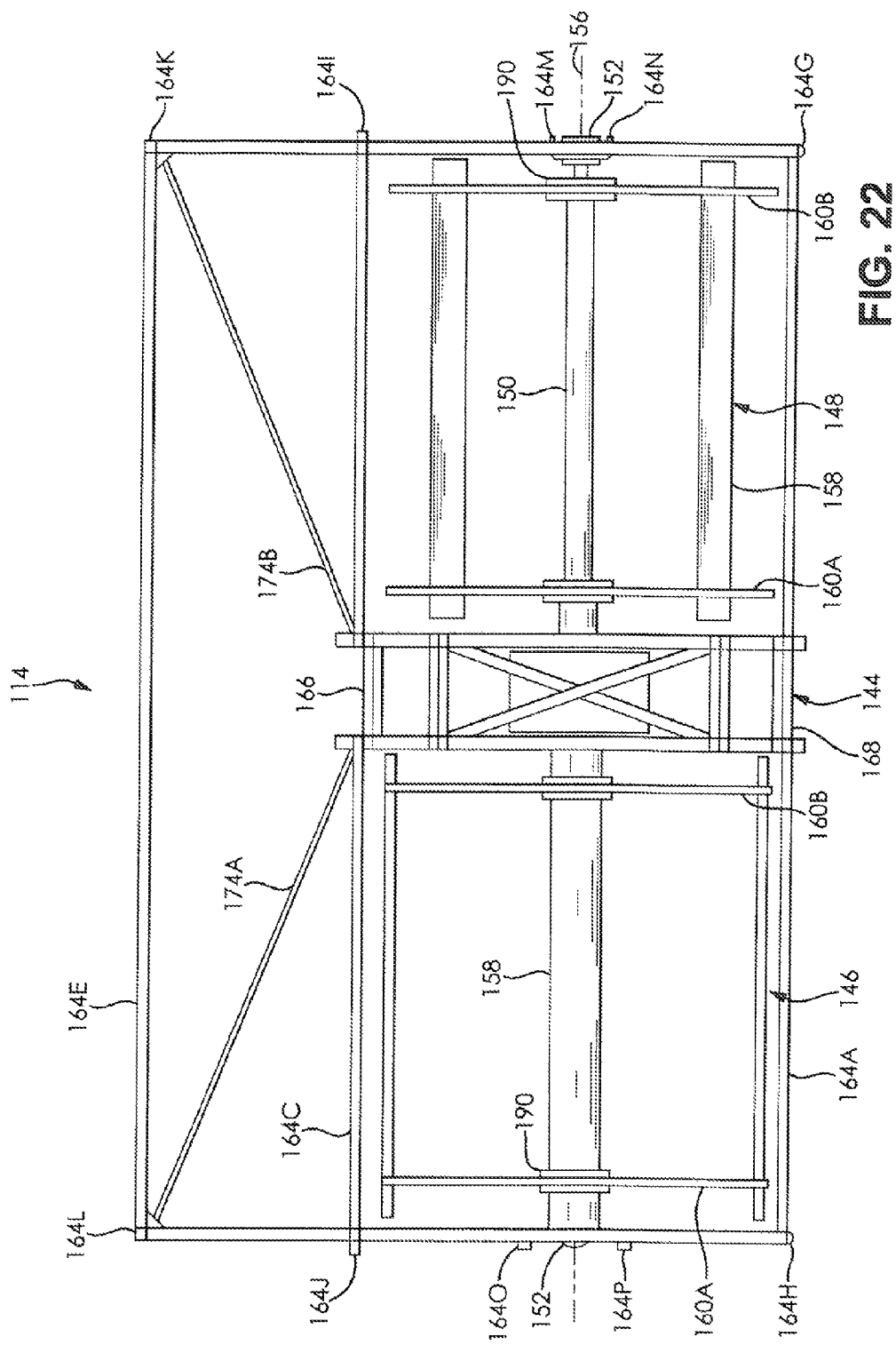
FIG. 22 is a front elevational view of the water turbine assembly of FIG. 21.
Figure 23:
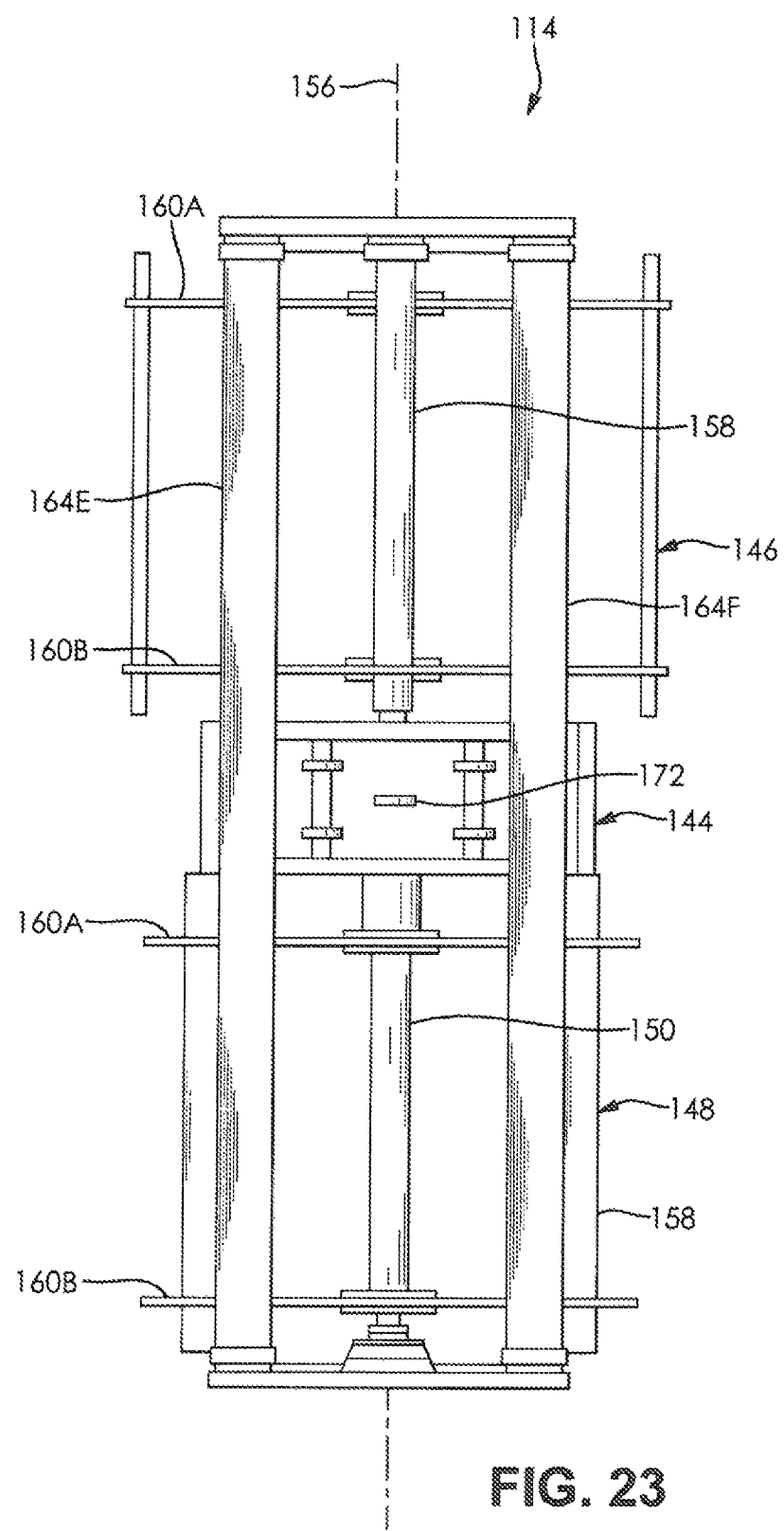
FIG. 23 is a top plan view of the water turbine assembly of FIGS. 21 and 22.
Figure 25:
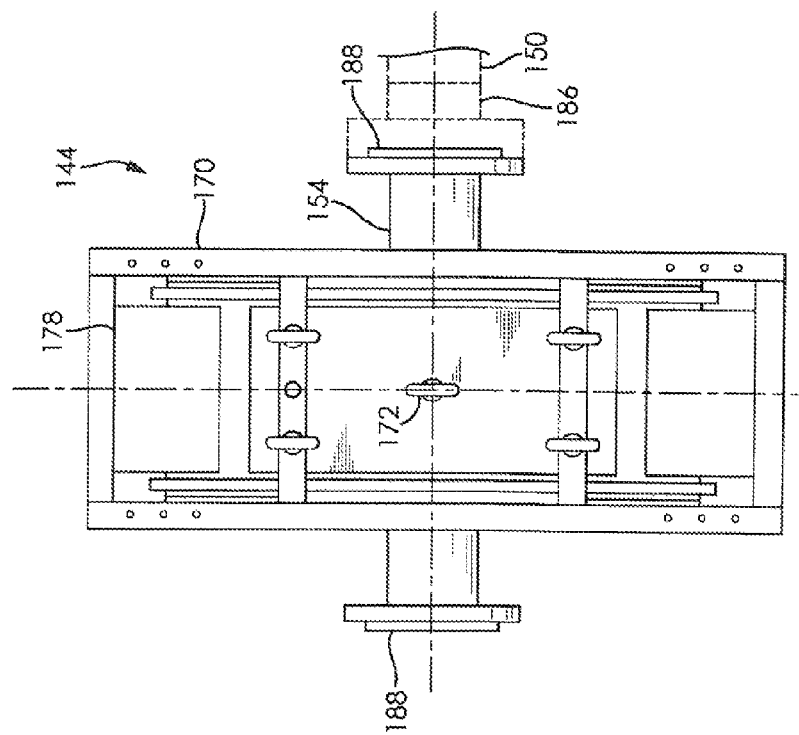
FIG. 25 is a top plan view of the power generation assembly of FIG. 24.
Figure 24:
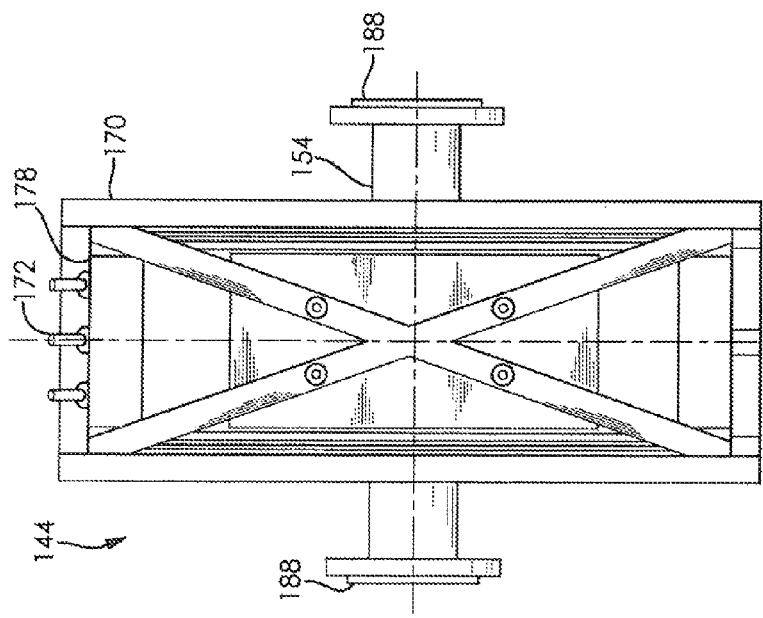
FIG. 24 is a front elevational view of a direct-drive power generation assembly of the water turbine assembly of FIGS. 21 to 23.
Figure 26:
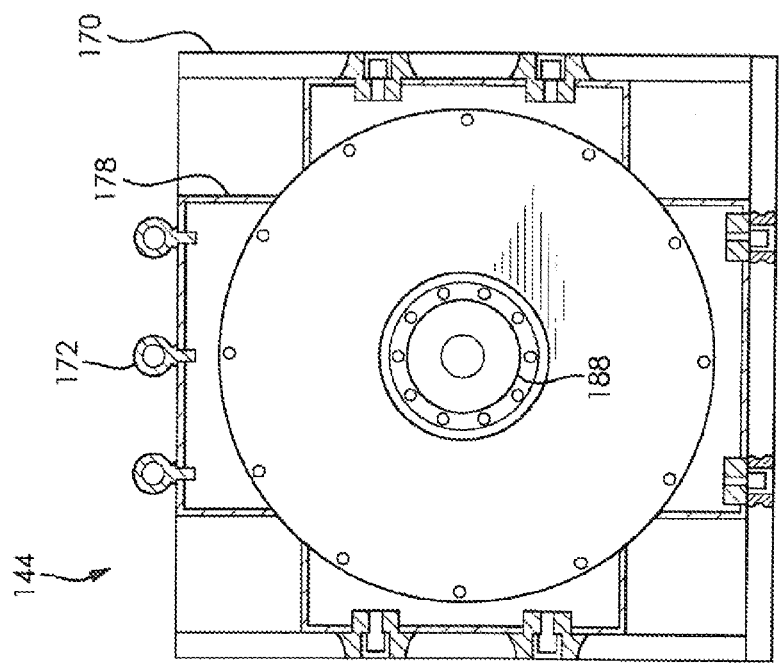
FIG. 26 is a left side elevational view of the power generation assembly of FIGS. 24 and 25.
Figure 27:
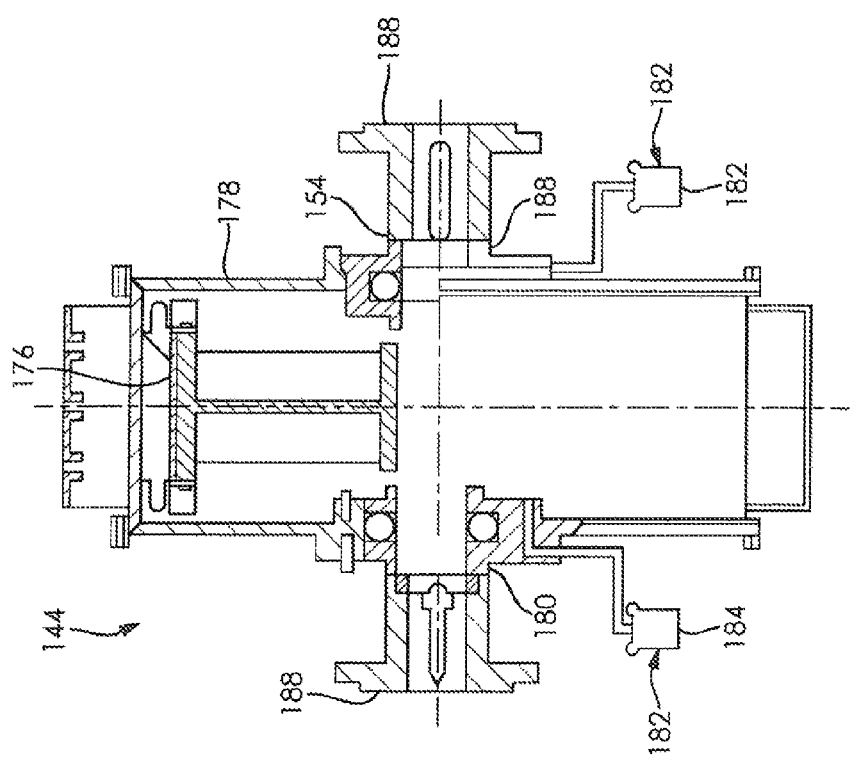
FIG. 27 is a schematic front view of the power generation assembly of FIGS. 24 to 26 showing a pressure compensation system.
Figure 28:
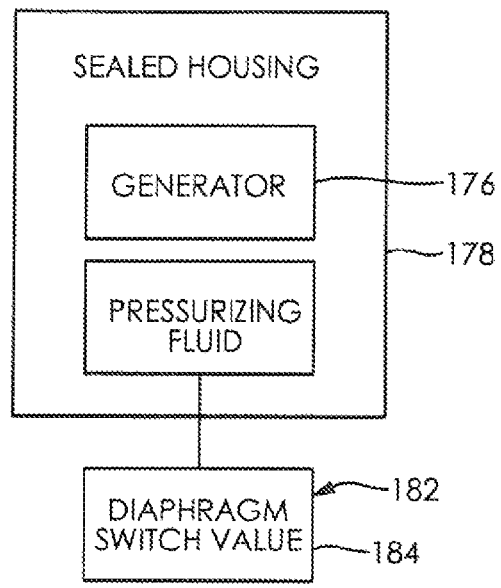
FIG. 28 is a block diagram of the pressure compensation system of FIG. 27.

As best shown in FIGS. 21 to 23, each illustrated water turbine assembly 114 includes a frame structure 142, a direct drive electrical power generator assembly 144, and a first and second coaxial rotors 146, 148 located on opposed lateral sides of the power generator assembly 144 and each having a rotating horizontal-axis central shaft 150. The illustrated shafts 150 each have an outer end connected to the frame structure 142 through a bearing assembly 152 and an inner end directly connected to a shaft 154 of the power generator assembly 144. Each of the rotors 146, 148 revolve about a horizontal, laterally extending central axis 156 of the shaft 150 and includes a set of four equally-spaced blades 158 connected to end or support discs 160 that are bolted to the central shaft 150. The blades 158 of the two rotors 146, 148 are staggered in configuration to improve efficiency as described above with regard to the first embodiment of the invention.

The illustrated frame structure 142 is a substantially rectangular and open frame structure having several vertical and horizontal frame members 162, 164 secured together about the power generator assembly 144 to form the box-like frame structure. The illustrated frame structure 142 is sized and shaped to support the power generator assembly 144 and the rotors 146, 148 entirely below the surface of the water. The frame members 162, 164 are secured together in any suitable manner such as, for example, mechanical fasteners, welding, and/or the like. The illustrated frame structure 142 includes rectangular-shaped box structures box structure 166, 168 secured to the top and the bottom of a frame 170 of the power generator assembly 144. The frame 170 of the power generator assembly 144 is provided with at least one attachment member 172 such as, for example, an eye to which the hoist rope 138 is attached to raise and lower the frame structure 142 with the hoist 128. Front and rear bottom horizontal frame members 164A, 164B laterally extend through and are secured to the bottom box structure 168. Front and rear intermediate horizontal frame members 164C, 164D extend through and are secured to the top box structure 166. Front and rear top horizontal frame members 164E, 164F are spaced above the intermediate horizontal frame members 164C, 164D to form the top of the frame structure 142. Left and right front vertical members 162A, 162B vertically connect ends of the front top, intermediate and bottom horizontal frame members 164A, 164C, 164E and left and right rear vertical members 162C, 162D vertically connect ends of the rear top, intermediate and bottom horizontal frame members 164B, 164D, 164F. Vertically spaced-apart horizontal frame members 164G, 164,H, 164I, 164J, 164K, 164L extend in the forward-rearward direction and are secured to the vertical members 162A, 162B, 162C, 162D at the bottom, intermediate and top horizontal members 164A, 164B, 164C, 164D, 164E, 164F. Between the bottom and intermediate horizontal members 164G, 164H, 164I, 164J are a pair of vertically spaced apart horizontal support members 164M, 164N, 164O, 164P extending in the forward and rearward direction and secured to the front and rear vertical members 162A, 162B, 162C, 162D on both the left and right sides of the frame structure 142. Extending between the horizontal support members 164M, 164N 164O, 164P are the bearing assemblies 152. Inclined cross members 174A, 174B extend from the tops of the vertical members 162A, 162B, 162C, 162D to the top box structure 166. It is noted that the frame structure 142 can alternatively have any other suitable configuration.

The illustrated individual frame members 162, 164, 174 are each designed to reduce the coefficient of drag of the frame structure 142 as described above with regard to the first embodiment. It is noted that all or only a portion of the frame members 162, 164, 174 can be shaped in this manner and that any other suitable shapes can alternatively be utilized but may have less or no benefit of the reduced coefficient of drag of the frame structure 142. Each of the illustrated frame members 162, 164, 174 are hollow aluminum extrusions in order to reduce weight as described above with regard to the first embodiment but it is noted that the frame members 162, 164, 174 can alternatively be solid and/or comprise any other suitable material such as for example, carbon fiber composite, but it may result in a heavier and/or costlier structure. The illustrated hollow portions or cavities of the frame members 162, 164, 174 are filled with a foam material to increase buoyancy of the frame structure as described above with regard to the first embodiment. It is noted that the foamed material can be eliminated if desired in some or all of the frame members 162, 164, 174 in applications where a lesser amount of or no buoyancy is not desired.

As best shown in FIGS. 24 to 28, the electrical power generator assembly 144 includes an underwater, direct drive, low speed high output, electrical generator 176 that converts the mechanical energy of the turning rotors 146, 148 into electrical energy and can be of any suitable type of electrical generator such as, for example, a radial gap generator or an axial gap generator. The illustrated generator 176 is configured as a direct drive generator. That is, the direct drive generator 176 includes no gear box, gears or the like to step up the rotational speed of the generator shaft 154. Thus, the direct drive generator 176 rotates at the same rate as the rotors 146, 148 and is relatively large to generate enough electricity from the motion of the rotors 146, 148. The illustrated generator 176 operates at a low speed between about 60 RPM and about 80 RPM and preferably a speed of about 70 RPM and has a high output of 35 kW or more.

The illustrated generator assembly 144 is also configured to operate while submerged entirely below the surface of the water. The illustrated generator assembly 144 has a sealed and pressurized housing 178 for the generator 176. Seals 180 are provided for the generator shaft 154 which laterally extends out of both sides of the housing 178. The interior of the housing 178 is pressurized and a pressure compensation system 182 is included to maintain the pressure within the housing 178 higher than the water pressure surrounding the housing 178. As water pressure increases around the housing 178, a diaphragm switch or valve 184 of the pressure compensation system 182 automatically allows pressured fluid (such as, for example, compressed air) to enter into the interior of the housing 178 to maintain the interior pressure above the surrounding water pressure. The pressurized fluid can be provided in any suitable manner such as, for example, a pressurized tank located within the housing, a pressurized tank located outside the housing either below or above the surface of the water and operably connected to the housing, a pump or compressor located above the surface of the water and operably connected to the housing, or a pump or compressor located below the surface of the water and operably provided with a source of fluid to be compressed. The higher pressure within the housing 178 prevents water leakage into the housing 178 even as the shaft seals 180 begin to wear. The illustrated generator 176 is naturally cooled by the surrounding water but an active cooling system can be included if desired.

Each illustrated water turbine assembly 114 has left and right rotors 146, 148 that are identical except that the blades 158 are staggered in configuration to improve efficiency as described above with regard to the first embodiment of the invention. Therefore only one of the rotors 146, 148 will be described in detail. The illustrated rotor shaft 150 is supported between the power generation assembly shaft 154 and the bearing assembly 152 of the frame structure 142 so that the shaft 150 rotates about the horizontally-disposed central axis 156 of the shaft 150. The shaft 150 is oriented to extend laterally between the frame structure bearing assembly 152 and the power generator assembly shaft 154 so that the rotor shaft 150 is perpendicular to the flow of water 16. The inner end of the shaft 150 is provided with a hub 186 that is secured to a hub 188 of the power generation assembly shaft 154 to rotatably support the inner end of the shaft 150. The illustrated bearing assembly 152 includes a graphite sleeve bearing adapted for marine use that rotatably supports the outer end of the shaft 150. The sleeve bearing is preferably water lubricated. The illustrated shaft 150 is a solid aluminum round bar but any other suitable configuration and/or material can alternatively be utilized.

Figure 29:
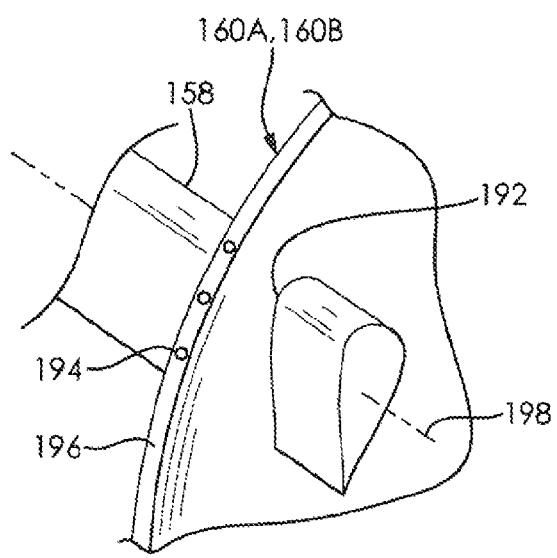
FIG. 29 is an enlarged fragmented perspective view a connection between a blade and a support disc of a rotor of the water turbine assembly of FIGS. 21 to 23.
Figure 30:
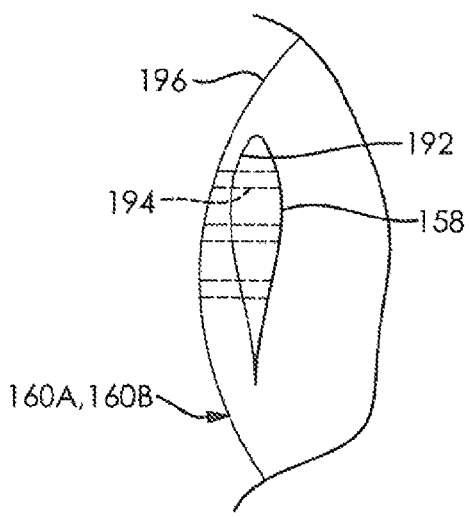
FIG. 30 is an end view the connection of FIG. 29.
Figure 35:
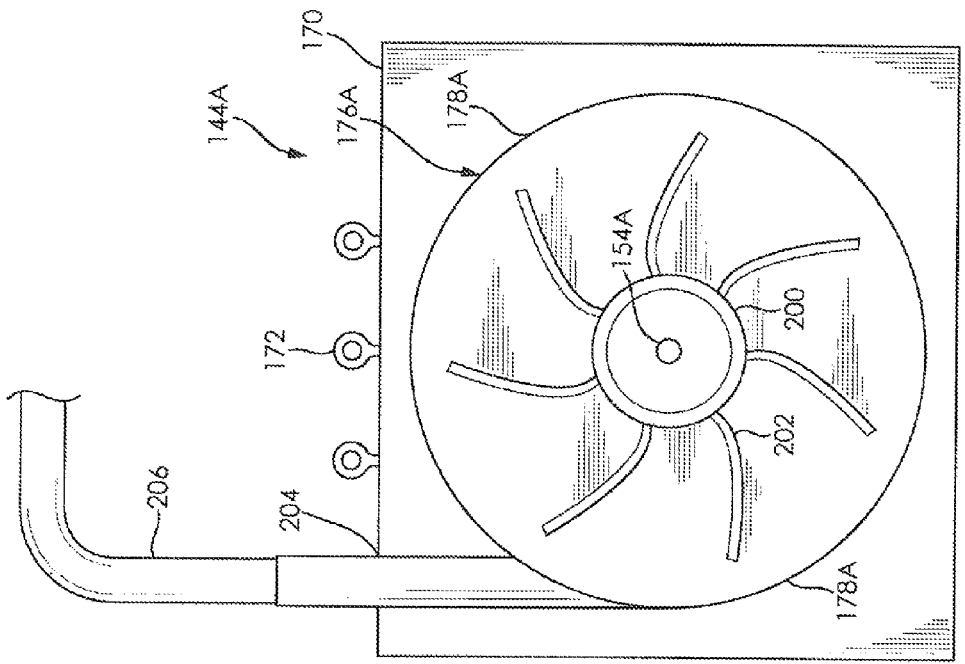
FIG. 35 is a schematic front view of the water pump assembly of FIGS. 32 to 34 showing a pressure compensation system.
Figure 34:
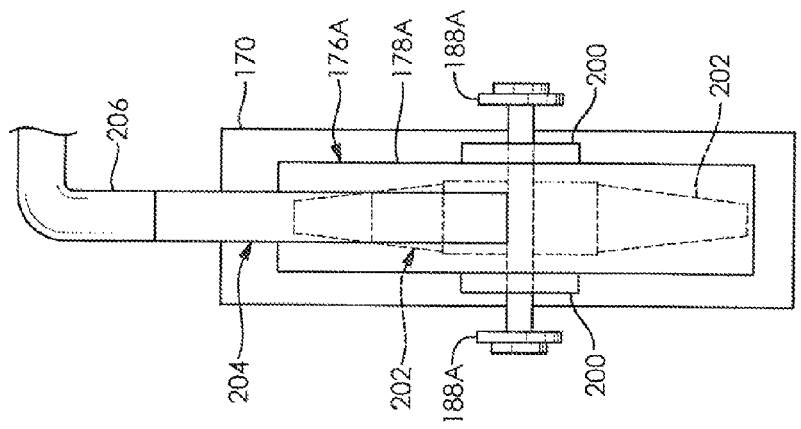
FIG. 34 is a schematic left side view of the water pump assembly of FIGS. 32 and 33.

The illustrated rotor 146, 148 has first and second support discs 160A, 160B rigidly secured to the shaft 150 and longitudinally spaced-apart along the length of the shaft 150. The illustrated support discs 160A, 160B are rigidly secured to the shaft 150 with hubs 190 but can be rigidly secured to the shaft 150 in any suitable manner such as for example, mechanical fasteners, welding, and the like. The illustrated set of four spaced-apart blades 158 extend between and through the first and second support discs 160A 160B and are equally and circumferentially spaced apart about the shaft 150. The illustrated rotor 146, 148 has four blades 158 between the two support discs 160A, 160B but any other suitable quantity of blades 158 and/or support discs 160A, 160B can alternatively be utilized. The illustrated blades 158 are spaced apart by 90 degrees from one another. As best shown in FIGS. 29 and 30, the illustrated blades 158 extend through openings 192 in the support discs 160A, 160B and are rigidly secured to the support discs 160A, 160B by fasteners 194 in the form of pins to prevent relative movement therebetween. The illustrated pins 194 extend from the edge 196 of the support disc 160A, 160B and are substantially perpendicular to the longitudinal axis 198 of the blades 158. Securing the blades 158 to the support discs 160A, 160B in this manner reduces stress or the connections and increases power due to the increased blade area extending beyond the support discs 160A, 160B. It is noted that the blades 158 can alternatively be secured to the support discs in any other suitable manner. It is noted that the rotor 146, 148 can alternatively have any other suitable configuration.

The illustrated rotor blades 158 have a hydrofoil shape in cross section as described above with regard to the first embodiment. Each of the illustrated rotor blades 158 are hollow and comprise aluminum extrusions in order to reduce weight but it is noted that the blades 158 can alternatively be solid and/or comprise any other suitable material such as, for example, carbon fiber composite, but it will result in heavier blades. The illustrated hollow portions or cavities of the blades 158 are filled with a foam material to increase buoyancy of the blades 158 to ease rotation of the rotor 146, 148 as described above with regard to the first embodiment.

In operation, the pontoon assemblies 112 are rigidly bound or secured together side-by-side so that the rotors 146, 148 of the two water turbine assemblies 114 are coaxial and extend laterally across the flow of water 16, that is, substantially perpendicular to the flow of water 16. The water turbine assemblies 114 are lowered into the water with the hoist 128 so that the rotors 146, 148 and the power generator assemblies 144 are each fully submerged. As the flow of water passes through the open frame structures 142 and the rotors 146, 148, the rotors 146, 148 of the two water turbine assemblies 114 are rotated in opposite directions by the flowing water. The rotors 146, 148 directly drive the electrical power generator assemblies 144 to produce electricity from the mechanical power generated by the flowing stream of water.

FIGS. 31 to 35 illustrate horizontal-axis hydrokinetic water turbine system 110A which is a second variation of the horizontal-axis hydrokinetic water turbine system 110 according to the second embodiment of the present invention described above with regard to FIGS. 16 to 29. This second variation of the horizontal-axis hydrokinetic water turbine system 110A is substantially the same as the first variation described above except that the direct-drive electrical power generator assembly 144 is replaced with a direct-drive liquid pump assembly 144A. The illustrated rotor shafts or shaft portions 150 each have an inner end directly connected to a pump shaft 154A of the water pump assembly 144A so that rotation of the rotor or rotor portions 146, 148 by the flowing stream of water 16, rotates the pump shaft 154A. Rotation of the illustrated pump shaft 154A enables the liquid pump assembly 144A to intake water from the flowing stream of water 16 and outflow pressurized water to a desired location.

The illustrated liquid pump assembly 144A has a frame 170 the same as the power generator assembly 144 described above. It is noted that by providing the liquid pump assembly 144A with the same mechanical interfaces with the frame structure 142 and the rotor shafts 150 as the power generator assembly 144, the liquid pump assembly 144A and the power generation assembly 144 can be interchangeable. It is noted that the frame structure 170 can alternatively have any other suitable configuration.

The liquid pump assembly 144A includes an underwater, direct drive, low speed centrifugal pump 176A that utilizes the mechanical energy of the turning rotors 146, 148 to pump water or other liquids. It is noted that the water pump 176A can be of any other suitable type of water pump such as, for example, positive displacement pumps such as diaphragm pumps, and the like. The illustrated water pump 176A is configured as a direct water pump. That is the direct drive water pump 176A includes no gear box, gears or the like to step up or multiply the rotational speed of the pump shaft 154A relative to the rotor shafts or shaft portions 150. Thus, the direct-drive pump 176 rotates at the same rate of rotation as the rotors 146, 148 and is relatively large in order to pump liquids with the relatively slow rotary motion of the rotors 146, 148. The illustrated pump 176A operates at a relatively low rotational speed between about 60 RPM and about 80 RPM and preferably a rotation speed of about 70 RPM but any other suitable operational speed can be alternatively utilized.

The illustrated water pump assembly 144A is also configured to operate while submerged entirely below the surface of the water. The inner ends of the illustrated rotor shafts or shaft portions 150 are provided with hubs 186 that are rigidly secured to hubs 188A provided on outer ends of the pump shaft 154A so that the pump shaft 154A is coaxial with the rotor shafts or shaft portions 150 and located at an intermediate location along the length of the pump shafts or shaft portions 150. Secured in this manner a pump housing 178A is positioned within the frame 170 and entirely below the surface of the water. It is noted that the pump 176A can alternatively be configured to be located above the water and driven with a drive connection located between the rotor shaft 150 and the pump shaft 154A as discussed above with regard to the first embodiment of the present invention. The drive connection can be, for example, a gear box, chain and sprockets, a belt and pulleys and the like and can multiply the rotational speed of the rotor shafts 150 so that the pump 176A operates at a higher rotational speed than the rotors 146, 148. The multiplier can be, for example 1:30 or 1:50 so that the pump shaft 154A rotates at 30 or 50 times greater than the rotors 146, 148 so that commercially available liquid pumps can be utilized. Additionally, locating the pump 176A above the water is preferable when the pump 176A is to be used to pump liquids other than the water from the stream of flowing water 16.

The illustrated water pump 176A has water inlet or intake manifold 200 configured to intake water from the flowing stream of water 16 into the pump housing 178A, where pump vanes 202 rotated by the pump shaft 154A pressurize and direct the water through a water outlet or outflow chamber 204 configured to outflow the pressurized water. The illustrated water inlet 200 is concentric with the pump shaft 154A and located on each side of the pump housing 178A so that water is drawn into the water pump 176A from each lateral side. It is noted that the water inlet 202 can alternatively have any other suitable configuration. The illustrated water outlet 204 extends upwardly from the rear side of the pump housing 178A and is suitably connected to a fluid conduit 206 for transporting the pressurized water from the pump 176A to a desired location It is noted that the water outlet 204 can alternatively have any other suitable configuration. Thus, the flowing stream of water 16 rotates the rotors 146, 148, which rotates the pump 176A, which pumps water out of the flowing stream of water 16 to a desired location. Such a configuration is desirable to provide water to an irrigation system located near the stream of flowing water 16 when electrical power is unavailable or in low supply.

Any of the features or attributes of the above described embodiments and variations can be used in combination with any of the other features and attributes of the above described embodiments and variations as desired.

From the foregoing disclosure it will be apparent that the present invention provides an improved hydrokinetic water turbine system because the counter rotating rotors reduce torque on the system and thus simplified mooring and flotation devices can be used. Additionally, by utilizing a horizontal rotational axis, sleeve bearings can be utilized and simple drive train mechanisms or a direct drive configuration can be used. Furthermore, by reducing the weight and increasing the buoyancy of the blades, lower flow velocity is required to rotate the rotor. Furthermore, by decreasing the drag of the frame structure within the flow stream, less forces are generated on the structure so that it can be made lighter and can lower negative impacts on the stream and thus the environment. The ability to have components of a relatively light weight reduces costs, increases efficiency, enables the system to be more easily transported and assembled, and allows the rotors to be rotated with less force so that the system produces a relatively large volume of electricity for its size and weight. It is believed that each rotor and frame assembly will weigh about 3000 pounds and produce about 20 kW of mechanical power at 2 m/s so that the full illustrated hydrokinetic water turbine system with two water turbine assemblies will weigh about 6000 pounds and produces about 40 kW at 2 m/s.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A hydrokinetic water turbine system configured to be placed in a flowing stream of water, said water turbine system comprising, in combination:
    a frame structure;
    a rotor shaft supported by the frame structure to rotate about a horizontally-disposed central axis of the rotor shaft;
    a rotor secured to the rotor shaft and having a first plurality of spaced-apart blades parallel to the central axis of the rotor shaft and circumferentially spaced apart about the rotor shaft, and a second plurality of space-apart blades extending parallel to the central axis of the rotor shaft and circumferentially space-apart about the rotor shaft so that the flowing stream of water revolves the rotor about the central axis of the rotor shaft;
    wherein the first and second plurality of blades are each rigidly secured to prevent relative movement between each of the blades;
    wherein the first and second plurality of blades are each straight in the longitudinal direction and have a hydrofoil shape in cross-section configured to generate lift and rotate the rotor about the horizontally disposed central axis as the flowing stream of water passes around the hydrofoil shape;
    wherein the second plurality of blades is spaced-apart from the first plurality of blades in the longitudinal direction and offset from the first plurality of blades so that the second plurality of blades is circumferentially located between the first plurality of blades for smooth rotation of the rotor; and
    a water pump having an inlet configured to intake water from the flowing stream of water, an outlet configured to outflow water from the stream of water, and a pump shaft directly driven by rotation of the rotor and configured to rotate at the same speed of rotation as the rotor.

2. The hydrokinetic water turbine system according to claim 1, wherein the water pump is a low-speed centrifugal pump.

3. The hydrokinetic water turbine system according to claim 1, wherein the water pump operates in the range of about 60 RPM to about 80 RPM.

4. The hydrokinetic water turbine system according to claim 1, wherein the pump shaft is operatively connected to the rotor shaft for rotation of a pump shaft at an intermediate position along the rotor shaft and between the first plurality of blades and the second plurality of blades.

5. The hydrokinetic water turbine system according to claim 4, wherein the water pump is located underwater.

6. The hydrokinetic water turbine system according to claim 5, wherein the pump shaft is co-axial with the shaft, located between first and second portions of the rotor shaft, and is rigidly secured to the first and second portions of the rotor shaft for rotation therewith.

7. The hydrokinetic water turbine system according to claim 1, wherein the first and second plurality of blades are each hollow extrusions with internal ribs between hollow cavities and the hollow cavities are filled with a material having a weight less than a weight of a material forming the extrusions.

8. The hydrokinetic water turbine system according to claim 7, wherein the hollow cavities are filled with a foam material.

9. The hydrokinetic water turbine system according to claim 7, wherein the extrusions comprise one of aluminum and carbon fiber composite.

10. A hydrokinetic water turbine system configured to be placed in a flowing stream of water, said water turbine system comprising, in combination:
    a frame structure;
    a rotor shaft supported by the frame structure to rotate about a horizontally-disposed central axis of the rotor shaft;
    a rotor secured to the rotor shaft and having a first plurality of spaced-apart blades parallel to the central axis of the rotor shaft and circumferentially spaced apart about the rotor shaft, and a second plurality of space-apart blades extending parallel to the central axis of the rotor shaft and circumferentially space-apart about the rotor shaft so that the flowing stream of water revolves the rotor about the central axis of the rotor shaft;

wherein the first and second plurality of blades are each rigidly secured to prevent relative movement between each of the blades;

wherein the first and second plurality of blades are each straight in the longitudinal direction and have a hydrofoil shape in cross-section configured to generate lift and rotate the rotor about the horizontally disposed central axis as the flowing stream of water passes around the hydrofoil shape;

wherein the second plurality of blades is spaced-apart from the first plurality of blades in the longitudinal direction and offset from the first plurality of blades so that the second plurality of blades is circumferentially located between the first plurality of blades for smooth rotation of the rotor;

wherein the first and second plurality of blades are each hollow extrusions with internal ribs between hollow cavities and the hollow cavities are filled with a material having a weight less than a weight of a material forming the extrusions; and a liquid pump having a pump shaft driven by rotation of the rotor.

11. The hydrokinetic water turbine system according to claim 10, wherein the liquid pump has an inlet configured to intake water from the flowing stream of water and an outlet configured to outflow water from the stream of water.

12. The hydrokinetic water turbine system according to claim 10, wherein the pump shaft is directly driven by rotation of the rotor and configured to rotate at the same speed of rotation as the rotor.

13. The hydrokinetic water turbine system according to claim 12, wherein the liquid pump is a low-speed centrifugal pump.

14. The hydrokinetic water turbine system according to claim 12, wherein the liquid pump operates in the range of about 60 RPM to about 80 RPM.

15. The hydrokinetic water turbine system according to claim 12, wherein the pump shaft is operatively connected to the rotor shaft for rotation of a pump shaft at an intermediate position along the rotor shaft and between the first plurality of blades and the second plurality of blades.

16. The hydrokinetic water turbine system according to claim 15, wherein the liquid pump is located underwater.

17. The hydrokinetic water turbine system according to claim 16, wherein the pump shaft is co-axial with the shaft, located between first and second portions of the rotor shaft, and is rigidly secured to the first and second portions of the rotor shaft for rotation therewith.

18. The hydrokinetic water turbine system according to claim 10, wherein the hollow cavities are filled with a foam material.

19. A hydrokinetic water turbine system configured to be placed in a flowing stream of water, said water turbine system comprising, in combination:

a frame structure;

a rotor shaft supported by the frame structure to rotate about a horizontally-disposed central axis of the rotor shaft;

a rotor secured to the rotor shaft and having a first plurality of spaced-apart blades parallel to the central axis of the rotor shaft and circumferentially spaced apart about the rotor shaft, and a second plurality of space-apart blades extending parallel to the central axis of the rotor shall and circumferentially space-apart about the rotor shaft so that the flowing stream of water revolves the rotor about the central axis of the rotor shaft;

wherein the first and second plurality of blades are each rigidly secured to prevent relative movement between each of the blades;

wherein the first and second plurality of blades are each straight in the longitudinal direction and have a hydrofoil shape in cross-section configured to generate lift and rotate the rotor about the horizontally disposed central axis as the flowing stream of water passes around the hydrofoil shape;

wherein the second plurality of blades is spaced-apart from the first plurality of blades in the longitudinal direction and offset from the first plurality of blades so that the second plurality of blades is circumferentially located between the first plurality of blades for smooth rotation of the rotor;

wherein the first and second plurality of blades are each hollow extrusions with internal ribs between hollow cavities and the hollow cavities are filled with a material having a weight less than a weight of a material forming the extrusions; and a submerged water pump having an inlet configured to intake water from the flowing stream of water, an outlet configured to outflow water from the stream of water, and a pump shaft directly driven by rotation of the rotor and configured to rotate at the same speed of rotation as the rotor.

20. The hydrokinetic water turbine system according to claim 19, wherein the pump shaft is operatively connected to the rotor shaft for rotation of a pump shaft at an intermediate position along the rotor shaft and between the first plurality of blades and the second plurality of blades, and wherein the pump shaft is co-axial with the shaft, located between first and second portions of the rotor shah, and is rigidly secured to the first and second portions of the rotor shaft for rotation therewith.

* * * * *